(12) United States Patent
Higuchi et al.

(10) Patent No.: US 10,190,918 B2
(45) Date of Patent: Jan. 29, 2019

(54) CIRCUIT APPARATUS, ELECTRONIC APPARATUS, AND MOVING OBJECT

(71) Applicant: Seiko Epson Corporation, Tokyo (JP)

(72) Inventors: Teppei Higuchi, Chino (JP); Hideo Haneda, Matsumoto (JP)

(73) Assignee: Seiko Epson Corporation (JP)

( * ) Notice: Subject to any disclaimer, the term of this patent is extended or adjusted under 35 U.S.C. 154(b) by 250 days.

(21) Appl. No.: 15/131,183

(22) Filed: Apr. 18, 2016

(65) Prior Publication Data
US 2016/0320187 A1    Nov. 3, 2016

(30) Foreign Application Priority Data
Apr. 28, 2015   (JP) .................................. 2015-091211

(51) Int. Cl.
| | |
|---|---|
| *G01C 19/5726* | (2012.01) |
| *G01K 7/20* | (2006.01) |
| *G01K 1/20* | (2006.01) |
| *G01K 7/42* | (2006.01) |
| *G01C 19/5776* | (2012.01) |
| *G01K 13/00* | (2006.01) |

(52) U.S. Cl.
CPC .......... *G01K 7/20* (2013.01); *G01C 19/5776* (2013.01); *G01K 1/20* (2013.01); *G01K 7/42* (2013.01); *G01C 19/5726* (2013.01); *G01K 13/00* (2013.01)

(58) Field of Classification Search
USPC ....................................................... 702/127
See application file for complete search history.

(56) References Cited

U.S. PATENT DOCUMENTS

| | | | | |
|---|---|---|---|---|
| 5,894,139 | A * | 4/1999 | Otsuki ................ | H01L 29/0696 257/139 |
| 6,194,958 | B1 * | 2/2001 | Goldfarb ............ | H03H 11/0472 327/552 |
| 7,150,561 | B1 * | 12/2006 | D'Aquino .............. | G01K 7/015 374/178 |
| 7,461,974 | B1 * | 12/2008 | Aslan ..................... | G01K 7/015 327/512 |
| 7,581,882 | B2 | 9/2009 | Noguchi | |
| 7,821,320 | B2 | 10/2010 | Ueda | |
| 2002/0014675 | A1 * | 2/2002 | Matsumoto .............. | G01K 7/01 257/470 |

(Continued)

FOREIGN PATENT DOCUMENTS

| | | |
|---|---|---|
| JP | 2007-192718 A | 8/2007 |
| JP | 2008-216234 A | 9/2008 |

*Primary Examiner* — Paul D Lee
(74) *Attorney, Agent, or Firm* — Harness, Dickey & Pierce, P.L.C.

(57) ABSTRACT

A circuit apparatus includes a voltage output circuit that outputs a first output voltage when a first current of first temperature characteristics flows in a resistance element, and a second output voltage when a second current of second temperature characteristics different from the first temperature characteristics flows in the resistance element, an A/D conversion circuit that outputs a first digital value by performing A/D conversion on the first output voltage, and outputs a second digital value by performing A/D conversion on the second output voltage, and a processing unit that obtains temperature data by digital calculation processing of the first digital value and the second digital value.

19 Claims, 18 Drawing Sheets

(56) References Cited

U.S. PATENT DOCUMENTS

| | | | |
|---|---|---|---|
| 2007/0046419 A1* | 3/2007 | Inagaki | G01K 7/24 338/13 |
| 2010/0214271 A1* | 8/2010 | Mizusako | G09G 3/3648 345/204 |
| 2013/0061680 A1* | 3/2013 | Sato | G01C 19/5607 73/662 |
| 2014/0355650 A1* | 12/2014 | Hong | G01K 7/16 374/170 |
| 2014/0355651 A1* | 12/2014 | Hong | G01K 7/16 374/170 |
| 2015/0300889 A1* | 10/2015 | Ramaraju | G01K 7/01 374/170 |
| 2016/0003683 A1* | 1/2016 | Leow | G01K 1/024 702/130 |
| 2016/0116345 A1* | 4/2016 | Furtner | G01K 7/01 374/178 |

* cited by examiner

CIRCUIT APPARATUS, ELECTRONIC APPARATUS, AND MOVING OBJECT

BACKGROUND

1. Technical Field

The present invention relates to a circuit apparatus, an electronic apparatus, a moving object, and the like.

2. Related Art

In the related art, various temperature sensors or a temperature detection circuit is known. Various specific methods for obtaining temperature data are studied. For example, a temperature dependent voltage that is an output voltage having temperature dependence is obtained and the temperature data may be output by using the temperature dependent voltage. For example, when the relationship represented as V=CT is satisfied by using a coefficient C between a temperature dependent voltage V and a temperature T, it is possible to obtain temperature T by using C determined from characteristics of circuit elements and a temperature dependent voltage V.

JP-A-2007-192718 discloses a method that detects temperature by trimming a reference voltage and a temperature dependent voltage generated by a band gap reference circuit (BGR circuit) using a subtraction amplification circuit. In addition, JP-A-2008-216234 discloses a method that detects temperature based on a reference voltage generated by the BGR circuit and a temperature dependent voltage generated by using the same resistance as a resistance used in the BGR circuit.

A resistance element is used in an output of a voltage of the temperature dependent voltage or the like. However, variation of characteristics of the resistance element is not considered in JP-A-2007-192718 or JP-A-2008-216234. For example, there is a problem that a resistance value is varied when variations are generated in the manufacturing process of the resistance element. In this case, since a voltage value, or the like, output by using the resistance element is also varied, it is difficult to perform highly accurate temperature detection.

In addition, it is known that a resistance value of a resistance element is also varied (has temperature characteristics) according to temperature. Therefore, it is necessary that correction considering the temperature characteristics of the resistance element is performed, or a circuit is so configured that the temperature characteristics do not affect the temperature dependent voltage. For example, since it is necessary to provide another resistance for reducing the temperature characteristics of the resistance element, there is problem that the size of a circuit increases.

SUMMARY

An advantage of some aspects of the invention is to provide a circuit apparatus, an electronic apparatus, a moving object, and the like that reduce the influence caused by variation of characteristics of a resistance element and obtain highly accurate temperature data.

The invention can be implemented as the following aspects or embodiments.

An aspect of the invention relates to a circuit apparatus including a voltage output circuit that outputs a first output voltage when a first current of first temperature characteristics flows in a resistance element, and a second output voltage when a second current of second temperature characteristics different from the first temperature characteristics flows in the resistance element; an A/D conversion circuit that outputs a first digital value by performing A/D conversion on the first output voltage, and outputs a second digital value by performing A/D conversion on the second output voltage; and a processing unit that obtains temperature data by digital calculation processing based on the first digital value and the second digital value.

In the aspect of the invention, an output voltage is output when a current with different temperature characteristics flows in the resistance element, and the temperature data is obtained by performing the digital calculation processing after the A/D conversion of the output voltage. In this way, since two output voltages are obtained by using the same resistance element, it is possible to reduce the influence by variation of characteristics of the resistance element and to obtain highly accurate temperature data by performing digital calculation processing using a digital value based on the output voltage.

In the aspect of the invention, the processing unit may perform the digital calculation processing that reduces the dependence of the temperature data with respect to resistance value of the resistance element.

With this configuration, even if a resistance value of the resistance element is varied, it is possible to reduce the influence on the temperature data caused by the variation, and to obtain highly accurate temperature data.

In the aspect of the invention, the processing unit may perform the digital calculation processing that reduces at least one of first variation of the temperature data by variation of a resistance value of the resistance element, and second variation of the temperature data by temperature characteristics of the resistance element.

With this configuration, it is possible to reduce at least one of the influence on the temperature data caused by the variation of the resistance value, and the influence on the temperature data caused by the temperature characteristics of the resistance value, and to obtain highly accurate temperature data.

In the aspect of the invention, the processing unit may obtain the temperature data by the digital calculation processing including division processing that divides the second digital value by the first digital value.

With this configuration, it is possible to reduce the influence of a resistance value included in both the first digital value and the second digital value caused by the division processing, and to obtain highly accurate temperature data.

In the aspect of the invention, in a case where the first digital value is $D_{REF}$, the second digital value is $D_{PTAT}$, and a given constant is m, the processing unit may perform processing that calculates, as the division processing, $(D_{PTAT}+m)/(D_{REF}+m)$.

With this configuration, it is possible to perform specific division processing using the first and second digital values.

In the aspect of the invention, the circuit apparatus may further include a first current generation circuit that generates the first current; and a second current generation circuit that generates the second current. The voltage output circuit may output a voltage, as the first output voltage, when the first current generated by the first current generation circuit flows in the resistance element, and may output a voltage, as the second output voltage, when the second current generated by the second current generation circuit flows in the resistance element.

With this configuration, it is possible to generate each of the first current and the second current by each of the first and second current generation circuits, and, for example, generate a constant current in which variation or the like of the first and second current is reduced.

In the aspect of the invention, the voltage output circuit may include a selection circuit that selects the first current and outputs the selected first current to the resistance element during a first period, and selects the second current and outputs the selected second current to the resistance element during a second period.

With this configuration, it is possible to output the first current and the second current to the resistance element of the voltage output circuit in a time division manner.

In the aspect of the invention, the first current may be a reference current with flat temperature characteristics, and the second current may be a current having one of positive temperature characteristics and negative temperature characteristics.

With this configuration, it is possible to use a current having specific temperature characteristics as the first and second current.

In the aspect of the invention, in a case where the second current has the positive temperature characteristics, the resistance element may be a resistance element having positive temperature characteristics, and in a case where the second current has the negative temperature characteristics, the resistance element may be a resistance element having negative temperature characteristics.

With this configuration, it is possible to match temperature characteristics of the second current and temperature characteristics of the resistance element, and to increase resolution in A/D conversion, by increasing the slope (variation of a voltage value corresponding to temperature variation) of temperature characteristics of the second output voltage.

In the aspect of the invention, the second current may have positive temperature characteristics, and the resistance element may be a well resistance or a diffusion resistance.

With this configuration, in a case where the second current has positive temperature characteristics, it is possible to use a well resistance or a diffusion resistance, as a resistance element, having the positive temperature characteristics, to match temperature characteristics of the second current and the temperature characteristics of the resistance element.

In the aspect of the invention, the processing unit may perform digital low-pass filter processing with respect to the temperature data obtained by the digital calculation processing.

With this configuration, it is possible to perform filter processing with respect to a result of the digital calculation processing, for example, to reduce time variation of the calculation result.

In the aspect of the invention, the processing unit may perform the digital low-pass filter processing where a cut-off frequency is varied with respect to the temperature data obtained by the digital calculation processing.

With this configuration, it is possible to appropriately set the cut-off frequency according to a condition.

In the aspect of the invention, the processing unit may set the cut-off frequency to a first frequency during a first period after starting, and may set the cut-off frequency to a second frequency lower than the first frequency during a second period after the first period has elapsed.

With this configuration, it is possible to converge temperature data to a stable given value within a relatively short amount of time after the starting.

In the aspect of the invention, the A/D conversion circuit may be a differential A/D conversion circuit that receives a differential input signal configured with a first input signal and a second input signal. The voltage output circuit may include, as the resistance element, a first resistance element and a second resistance element. The voltage output circuit may output, as a voltage of the first input signal, an output voltage when the first current flows in the first resistance element to the A/D conversion circuit, and may output, as a voltage of the second input signal, an output voltage when the first current flows in the second resistance element to the A/D conversion circuit, in a case where the first output voltage is output, and may output, as a voltage of the first input signal, an output voltage when the second current flows in the first resistance element to the A/D conversion circuit, and may output, as a voltage of the second input signal, an output voltage when the second current flows in the second resistance element to the A/D conversion circuit, in a case where the second output voltage is output.

With this configuration, it is possible to use the differential voltage output circuit and the A/D conversion circuit and to widen, for example, an input voltage range of the A/D conversion circuit compared to a case of a single type.

In the aspect of the invention, the circuit apparatus may further include a detection circuit that outputs physical quantity data corresponding to physical quantity based on a detection signal corresponding to the physical quantity output from a physical quantity transducer; and a drive circuit that drives the physical quantity transducer. The processing unit may perform correction processing based on the temperature data with respect to the physical quantity data from the detection circuit.

With this configuration, since correction processing of physical quantity data is performed by using temperature data accurately obtained, it is possible to output highly accurate physical quantity data.

Another aspect of the invention relates to an electronic apparatus including the circuit apparatus.

Still another aspect of the invention relates to a moving object including the circuit apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
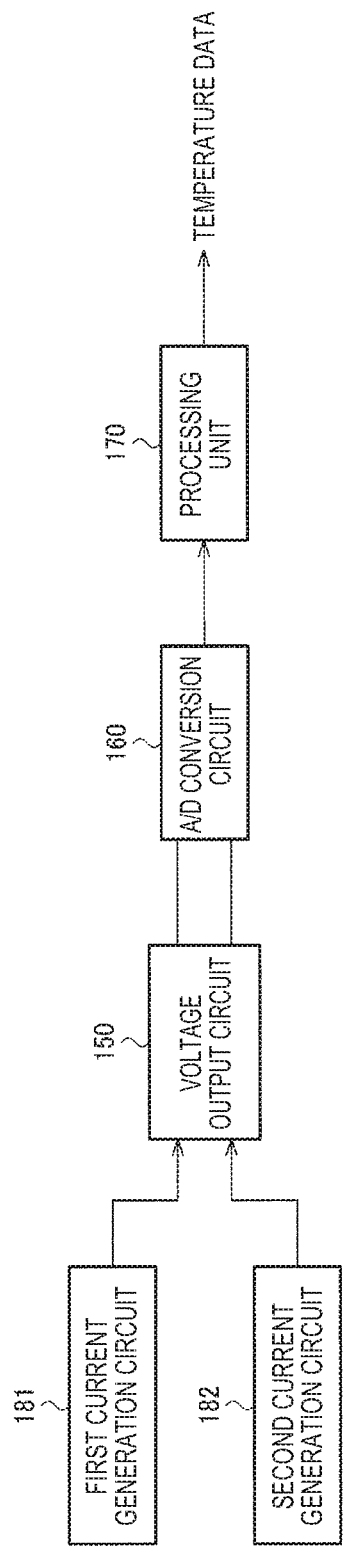
FIG. 1 is an example of a configuration of a circuit apparatus of the present embodiment.

Hereinafter, preferred embodiments of the invention will be described. In addition, the embodiment described below is not intended to unduly limit the content of the invention in the appended claims, and all configurations described in the embodiment are not necessarily essential as solving means of the invention.

1. Method of Embodiment

First, a method of the embodiment will be described. As in JP-A-2007-192718 and JP-A-2008-216234, various temperature sensors and temperature detection circuits are known. In a case where temperature data is obtained, it is common to use a given output voltage (temperature dependent voltage in JP-A-2007-192718, or the like) having temperature dependence. Accordingly, there are many cases where an I-V conversion circuit is used to generate an output voltage and the I-V conversion circuit includes a given resistance element.

However, the resistance value of the resistance element is varied by various conditions. For example, as described below, a resistance element that has temperature characteristics and variation of the resistance values according to temperature is a common type of resistance element. Therefore, it is observed that the influence on the temperature data caused by temperature characteristics of the resistance element is reduced, even in JP-A-2008-216234.

However, it is also considered that resistance elements with different characteristics can be manufactured according to process variations, regardless of attempts to manufacture a resistance element having the same characteristics. For example, in a case where the two resistance elements are manufactured by the same procedure and have the same characteristics, it is common that each of the elements has temperature characteristics, that is, resistance values R1 and R2 of each resistance element are functions R1 (T) and R2 (T) of temperature T, respectively, as described above. When the same temperature T is $T_0$, it is expected that the two resistance values R1 ($T_0$) and R2 ($T_0$) are equal. However, there is a possibility that a condition of R1 ($T_0$)≠R2 ($T_0$) is also generated without satisfying the expectation, and the variation of the resistance values also affects the temperature data.

In other words, a resistance value is varied by two factors that first, variation such as process variation or the like generates, and that second, temperature characteristics are included. Therefore, since the variation of resistance values leads to variations of the output voltage, it is necessary to reduce the influence caused by the variation of the resistance values so as to output highly accurate temperature data.

However, a method that effectively reduces the influence caused by the process variation is not disclosed in the related art. Accordingly, for example, there is a first problem that is very complicated in that it is necessary to perform adjustment work for suppressing the process variation, before shipment, or the like, of the circuit apparatus.

In addition, it is observed that the influence of the temperature characteristics on the resistance element is reduced, even in the related art as described above. However, as the related art, in a case where calculation is performed in an analog circuit, there is a second problem that measures that another resistance element for reduction is provided are necessary, and the size of the circuit increases, so as to reduce (cancel in a narrow sense) the temperature characteristics of the resistance element. In addition, the calculation in the analog circuit also includes a problem that the power consumption is increased.

Therefore, the present applicant proposes a method for obtaining the temperature data by digital calculation processing. Specifically, a circuit apparatus 20 according to the embodiment includes a voltage output circuit 150 that outputs a first output voltage $V_{REF}$ when a first current $I_{REF}$ of first temperature characteristics flows in a resistance element, and a second output voltage $V_{PTAT}$ when a second current $I_{PTAT}$ of second temperature characteristics different from the first temperature characteristics flows in a resistance element, an A/D conversion circuit 160 that outputs a first digital value $D_{REF}$ by performing A/D conversion on the first output voltage $V_{REF}$, and a second digital value $D_{PTAT}$ by performing A/D conversion on the second output voltage $V_{PTAT}$, and a processing unit 170 that obtains temperature data by performing digital calculation processing of the first digital value $D_{REF}$ and the second digital value $D_{PTAT}$.

Here, the resistance element, for example, is a resistance element included in the voltage output circuit. For example, the resistance element may have a value of R1 and R2 in FIGS. 7A and 7B, or R1 in FIGS. 19A and 19B, described below. Specific examples of the resistance element will be described below. Additionally, as described below using FIG. 10 or the like, it is considered that the resistance element has temperature characteristics.

In the embodiment, first, two output voltages are converted into two digital values, and then temperature data is obtained by digital calculation processing using the two digital values. Therefore, there is a possibility that the power consumption can be made small and the size of the circuit also is small compared to a case where the influence of variations, or the like, of a resistance value is reduced by an analog circuit. In addition, in the embodiment, a resistance element used in a case of obtaining the first output voltage $V_{REF}$ and the second output voltage $V_{PTAT}$ is common. Therefore, characteristics of the resistance element affect both of the digital values $D_{REF}$ and $D_{PTAT}$. That is, it is possible to reduce variation of the characteristics of the resistance element and to obtain more highly accurate temperature data, when calculation using both $D_{REF}$ and $D_{PTAT}$ is performed.

That is, the processing unit 170 according to the embodiment may perform digital calculation processing that reduces the dependence (dependence that value of temperature data is also varied by varying resistance value) of temperature data with respect to the resistance value of the resistance element. With this, it is possible to output highly accurate temperature data through digital calculation processing, although in the related art, for example, adjustment work or the like of a resistance value is required so as to output highly accurate temperature data. Therefore, there is an advantage in being able to simplify manufacturing and shipping process.

In addition, the processing unit 170 according to the embodiment can perform digital calculation processing that reduces variation of at least any one of first variation of temperature data according to variation of a resistance value of a resistance element and second variation of temperature data according to temperature characteristics of the resistance element.

There is a possibility that variation of the value is generated by the resistance element in the temperature data. Specifically, the variation is caused by two factors of variation of a resistance value and temperature characteristics caused by process variations. Here, the variation of the temperature data by the former factor is a first variation, and the variation of the temperature data by the latter factor is a second variation. On the other hand, in the method of the embodiment, since it is possible to reduce the variation of the temperature data from these two factors through the digital calculation processing of the processing unit 170, it is possible to output highly accurate temperature data, to perform easy adjustment in the output of the temperature data, and to reduce power consumption and the scale of circuit compared to a case where reduction processing is performed by an analog circuit.

Hereinafter, each part of the circuit apparatus according to the embodiment will be described in detail. Then, examples of an apparatus including the circuit apparatus according to the embodiment, specifically, physical quantity detection device, electric equipment, a moving object, or the like will be described. Last, modification examples of the voltage output circuit 150 (and A/D conversion circuit 160) of the circuit apparatus will be described.

2. Configuration Example and Details of Operation of Each Part

An example of a detailed configuration of the circuit apparatus 20 according to the embodiment will be described. First, an example of the overall configuration of the circuit apparatus 20 will be described, and then each part will be described in detail.

2.1 Example of Overall Configuration of Circuit Apparatus

An example of the overall configuration of the circuit apparatus 20 according to the embodiment is illustrated in FIG. 1. The circuit apparatus 20 includes a first current generation circuit 181, a second current generation circuit 182, the voltage output circuit 150, the A/D conversion circuit 160, and the processing unit 170.

The first current generation circuit 181 generates a first current $I_{REF}$ having first temperature characteristics. The second current generation circuit 182 generates a second current $I_{PTAT}$ having second temperature characteristics. Details of the first current generation circuit 181 and the second current generation circuit 182 will be described below using FIG. 2 and FIG. 3.

The voltage output circuit 150 outputs a first output voltage $V_{REF}$ when a first current $I_{REF}$ flows in a resistance element, and a second output voltage $V_{PTAT}$ when a second current $I_{PTAT}$ flows in a resistance element. A specific circuit configuration will be described below using FIGS. 7A and 7B. In addition, the voltage output circuit 150 may be operated in a time division as described below using FIG. 6, output the first output voltage $V_{REF}$ during a first period, and output the second output voltage $V_{PTAT}$ during a second period.

The A/D conversion circuit 160 outputs a first digital value $D_{REF}$ to the processing unit 170 by performing A/D conversion on the first output voltage $V_{REF}$, and outputs a second digital value $D_{PTAT}$ to the processing unit 170 by performing A/D conversion on the second output voltage $V_{PTAT}$. In addition, as described above, when it is considered that first output voltage $V_{REF}$ and the second output voltage $V_{PTAT}$ are output in a time division manner, the A/D conversion circuit 160 may be realized by an A/D conversion circuit driven in the time division manner, and may be a successive-approximation register type (SAR type) A/D conversion circuit.

The processing unit 170 obtains temperature data by digital calculation processing of the first digital value $D_{REF}$ and the second digital value $D_{PTAT}$. The processing unit 170, for example, is a digital signal processor (DSP). Specific digital calculation processing performed in the processing unit 170 will be described below.

2.2 Current Generation Circuit

As described in FIG. 1, the circuit apparatus 20 according to the embodiment includes the first current generation circuit 181 that generates a first current $I_{REF}$ and the second current generation circuit 182 that generates a second current $I_{PTAT}$. According to this, it is possible to generate the first current $I_{REF}$ and the second current $I_{PTAT}$ by each of the current generation circuits (circuit using work function difference, such as those described below in a narrow sense). Hereinafter, a configuration of each of the current generation circuits or temperature characteristics of first and second currents will be described by using FIG. 2 to FIG. 5.

Figure 2:
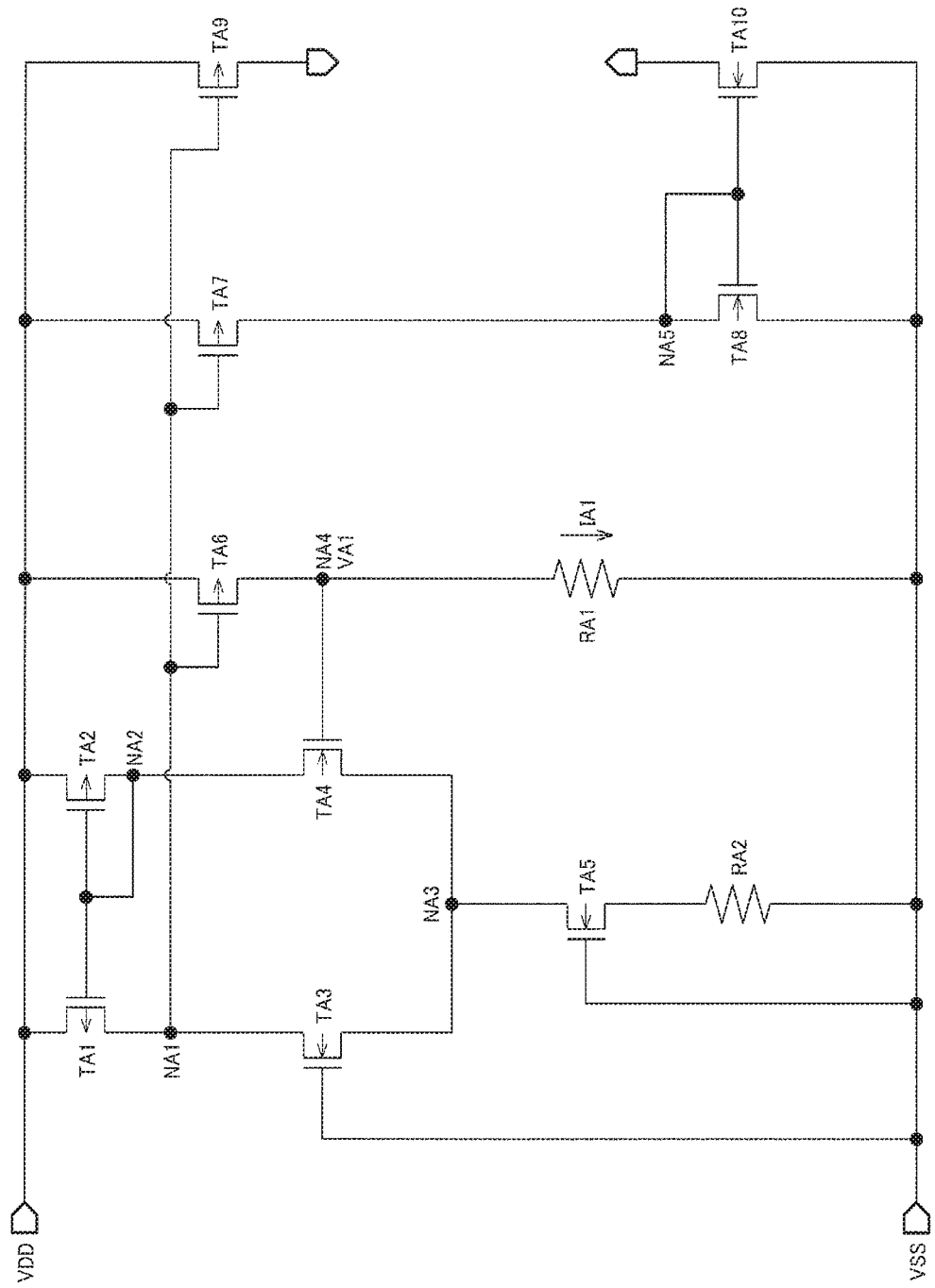
FIG. 2 is an example of a configuration of a first current generation circuit.

FIG. 2 is an example of a detailed configuration of the first current generation circuit 181. The first current generation circuit 181 is operated by supplying a power supply voltage VDD of a high potential side (for example, 1.8 V) and a power supply voltage VSS (for example, 0 V) of a lower potential side.

The first current generation circuit 181 includes transistors TA1 and TA2 constituting a current mirror circuit, transistors TA3 and TA4 constituting differential pair, and a transistor TA5 and a resistance element RA2 constituting a current source. The transistors TA1 and TA2 are P-type transistors (broadly, first conductivity type transistor) and transistors TA3, TA4, and TA5 are N-type transistors (broadly, second conductivity type transistor). In addition, the transistors TA1, TA2, and TA4 are enhancement-type transistors, and the transistors TA3 and TA5 are depletion-type transistors.

The transistors TA1 and TA2 are provided between a node of the power supply voltage VDD (first power supply voltage) and nodes NA1 and NA2. The power supply voltage VDD is supplied to a source of the transistors TA1 and TA2, and a gate electrode of the transistors TA1 and TA2 is connected to the node NA2 of a drain of the transistor TA2.

The transistors TA3 and TA4 are provided between the nodes NA1 and NA2, and a node NA3. The power supply voltage VSS is supplied to a gate electrode of the transistor TA3. A gate electrode of the transistor TA4 is connected to a node NA4 of a drain of a transistor TA6.

The transistor TA5 and the resistance element RA2 constitute a current source by being provided in series between the node NA3 and a node of the power supply voltage VSS. The power supply voltage VSS is supplied to a gate electrode of the transistor TA5, and one end of the resistance element RA2 is connected to a source of the transistor TA5. The other end of the resistance element RA2 is connected to a node of the power supply voltage VSS.

In addition, the first current generation circuit 181 includes the drive transistor TA6 and the resistance element RA1. The transistor TA6 is a P-type transistor. The transistor TA6 is provided between a node of the power supply voltage VDD and the node NA4 connected to a gate of the transistor TA4, and the node NA1 is connected to a gate electrode thereof. The transistor TA6 and the resistance element RA1 are provided between a node of the power supply voltage VDD and a node of the power supply voltage VSS.

The transistor TA3 is a transistor having conductivity of the gate electrode different from that of the transistor TA4. For example, a gate electrode of the transistor TA3 is an N-type, and a gate electrode of the transistor TA4 is a P-type. For example, impurity concentration of a substrate and impurity concentration of channels of the transistors TA3 and TA4 are the same. However, since gate electrodes of the transistors TA3 and TA4 have different conductivity, impurity concentrations of the gate electrodes are different from each other.

Specifically, a threshold voltage of MOS transistors can be represented as Vth=$\phi$MS−QSS/COX+2$\phi$F+QD/COX. Here, $\phi$MS is a work function difference between a gate electrode and a substrate, QSS is a fixed charge within an oxide film, COX is capacitance per unit area of a gate oxide film, $\phi$F is a Fermi level, and QD is a charge within a depletion layer. By setting the impurity concentration of the N-type gate electrode of the transistor TA3 and the impurity concentration of the P-type gate electrode of the transistor TA4, a threshold voltage VTN of the transistor TA3 of a depletion type is set to, for example, −0.52 V, and a threshold voltage VTP of the transistor TA4 of an enhancement type is set to, for example, 0.45 V. Accordingly, the power supply voltage VA1 of VTP−VTN=0.97 V is output to an output node NA4 of the first current generation circuit 181. That is, it is possible to supply the power supply voltage VA1 which is a constant voltage, even in a case where the power supply voltage VDD is varied.

In addition, in FIG. 2, since the transistor TA5 is a transistor of the depletion type, it is possible to realize a current source for supplying a bias current, even without separately providing a bias current generation circuit.

In this case, a constant current IA1 that satisfies IA1=VA1/RA1 flows in the resistive element RA1 which is provided between the node NA4 and the power supply voltage VSS. Here, VA1 has negative temperature characteristics, that is, a voltage value is varied (voltage value monotonically decreases) by a negative slope as temperature increases. Therefore, it is possible to generate a flat reference current with respect to temperature by offsetting negative temperature characteristics of VA1 and RA1 as IA1, when a resistance element having negative temperature characteristics as the resistance element RA1, that is, a resistance value varied (resistance value monotonically decreased) by a negative slope as temperature increases is used.

In addition, gate electrodes of the transistors TA6 and TA7 are controlled by a signal of an output node NA1 between the transistors TA1 and TA4. Here, a current ratio of a current IA1 that flows in the resistance element RA1 and a constant current IA2 that flows in the transistor TA7 is set according to setting of a transistor ratio (W/L) of transistors TA6 and TA7.

Therefore, a gate and a drain of the N-type transistor TA8 are connected to a node NA5, and a bias voltage VBS from the node NA5 (or constant current that generates VBS as control voltage) is supplied to each of the analog circuits of the circuit apparatus. For example, the first current generation circuit 181 includes an N-type transistor TA10, and can output a constant current $I_{REFN}$ corresponding to IA1 by using the bias voltage VBS for controlling of a gate electrode of the TA10.

However, as described below, when a case or the like where a differential A/D conversion circuit is used as the A/D conversion circuit 160 is considered, the first current generation circuit 181 may output two constant currents. For example, the first current generation circuit 181, as illustrated in FIG. 2, may be used both as a signal at an output node NA1 and a signal at the output node NA5 in controlling of a gate electrode of the transistor.

The first current generation circuit 181 includes a P-type transistor TA9, and a signal of the output node NA1 is used in controlling of a gate electrode of TA9. In this case, a constant current $I_{REFP}$, (current determined by a transistor ratio of TA6 and TA9) corresponding to the constant current IA1 from a drain of the transistor TA9 flows and is output, and a constant current $I_{REFN}$ (current determined by a transistor ratio of TA8 and TA10) corresponding to the constant current IA1 to a source of the transistor TA10 flows and is input. In this embodiment, the constant current $I_{REFP}$) and the constant current $I_{REFN}$ are a first current. Hereinafter, two constant currents for simplifying the description are assumed as $I_{REFP}=I_{REFN}$ ($=I_{REF}$). However, the invention is not limited thereto.

Figure 3:
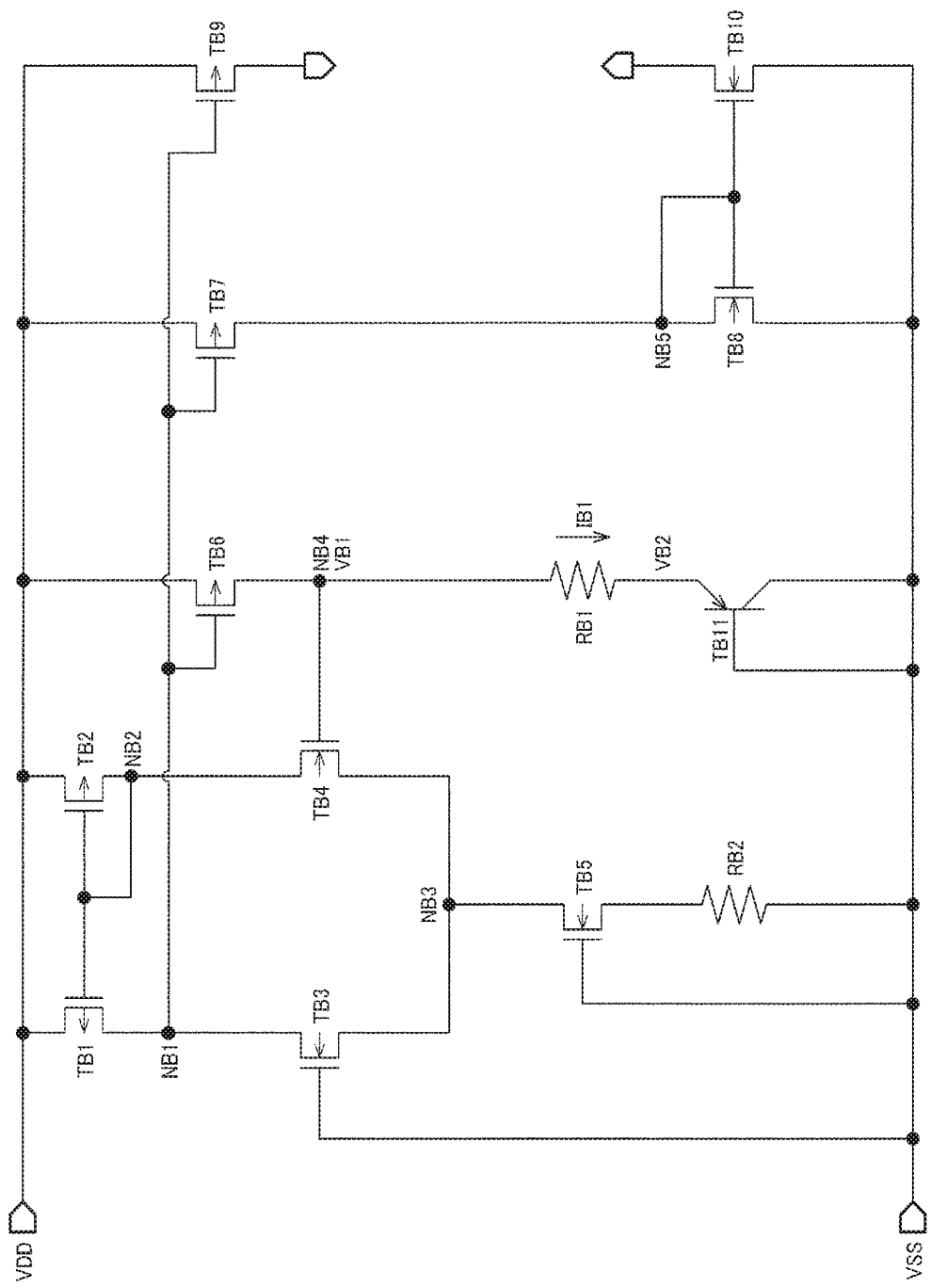
FIG. 3 is an example of a configuration of a second current generation circuit.

FIG. 3 is an example of a detailed configuration of the second current generation circuit 182. The second current generation circuit 182 is operated by supplying the power supply voltage VDD of a high potential side (for example, 1.8 V) and the power supply voltage VSS (for example, 0 V) of a low potential side.

Transistors TB1 to TB10 and RB1 and RB2 in FIG. 3 are the same as TA1 to TA10 and RA1 and RA2 in FIG. 2, and are also the same as NA1 to NA5 with respect to nodes NB1 to NB5. In a case where FIG. 2 and FIG. 3 are compared, the second current generation circuit 182 additionally provides a bipolar transistor TB11 between the resistance element RB1 and the power supply voltage VSS.

Figure 4:
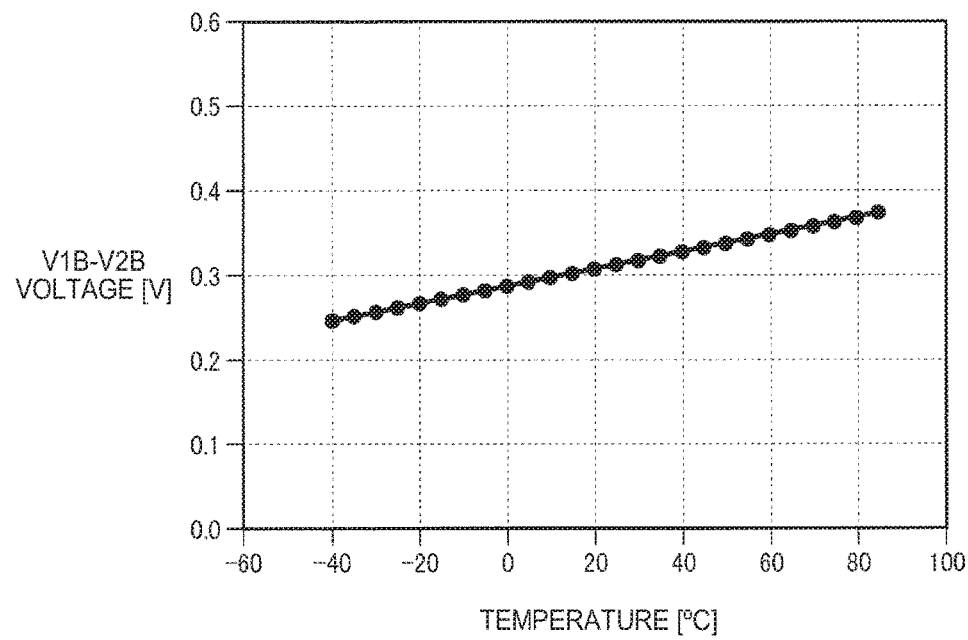
FIG. 4 is an example of temperature characteristics of a voltage applied to a resistance element included in the second current generation circuit.

TB11 is, for example, a PNP-type bipolar transistor, an emitter thereof is connected to one end of a different side from a node NB4 in the RB1, and a base and a collector thereof are connected to the power supply voltage VSS. The bipolar transistor TB11 is realized by a diffusion region (impurity region) and a well region formed on a semiconductor substrate. Here, when an emitter potential of the transistor TB11 is VB2, a potential difference VB1−VB2 for the node NB1 has positive temperature characteristics, as illustrated in FIG. 4. In FIG. 4, a horizontal axis represents temperature, a vertical axis represents the potential difference VB1−VB2, and VB1−VB2 has a positive slope (monotonically increases) as known in FIG. 4.

Therefore, a current IB1 flowing in the resistance element RB1 satisfies IB1=(VB1−VB2)/RB1. RB1 has negative temperature characteristics the same as RA1 described above. That is, since a value with positive temperature characteristics is divided by a value having negative temperature characteristics, the current IB1 has positive temperature characteristics. Therefore, a second current $I_{PTAT}$ corresponding to IB1 also has positive temperature characteristics.

Figure 5:
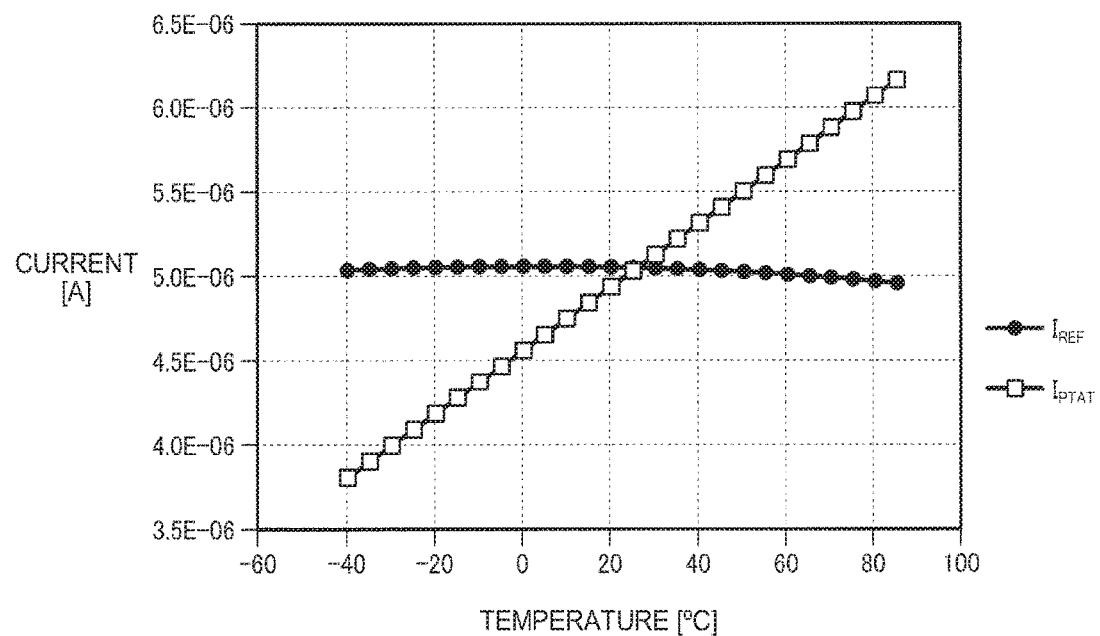
FIG. 5 is an example of temperature characteristics of a first current and a second current.

FIG. 5 illustrates an example of specific temperature characteristics of $I_{REF}$ and $I_{PTAT}$. In FIG. 5, a horizontal axis represents temperature, and a vertical axis represents a current value. As known from FIG. 5, the first current $I_{REF}$ has characteristics where variation of a current value is very small with respect to temperature variation. Meanwhile, the second current $I_{PTAT}$ has characteristics having a positive slope with respect to temperature variation.

In addition, the first and second current generation circuits are not limited to configurations of FIG. 2 and FIG. 3, a part of the components will be omitted, and various modification examples can be implemented, such as the addition of other elements.

As illustrated above, the first current $I_{REF}$ according to the embodiment may be a reference current with flat temperature characteristics, and the second current $I_{PTAT}$ may be a current with temperature characteristics of one of positive temperature characteristics and negative temperature characteristics. In FIG. 3 to FIG. 5, $I_{PTAT}$ is assumed to have positive temperature characteristics. However, $I_{PTAT}$ may have different temperature characteristics from $I_{REF}$. Accordingly, when $I_{REF}$ has flat temperature characteristics, $I_{PTAT}$ may have one of positive temperature characteristics and negative temperature characteristics. Here, the flat temperature characteristics are characteristics where a value is not varied, even if temperature is varied in a narrow sense. In this case, a value of the first current $I_{REF}$ is not varied, even if the temperature is varied. That is, it is represented that a slope of a current value corresponding to the temperature variation is 0. However, the flat temperature characteristics in the embodiment are not limited to a case where the slope is completely 0, and may have a slight slope. As an example, in a case where the value a (maximum value, average value, or the like) of a slope that represents variation of a current value corresponding to the temperature variation satisfies $\Delta \geq a$ with respect to a given threshold $\Delta$ is not 0, it may be considered that the temperature characteristics are flat.

In this embodiment, as described above, the influence of variation of the resistance value and temperature characteristics of a resistance element (different from RA1, RA2, RB1, and RB2 described above, in resistance element of voltage output circuit 150) is reduced by digital calculation processing. In this respect, when two current values are used, the influence by variation, or the like, of the resistance value on both the current values is generated. Accordingly, it is possible to reduce the influence of the characteristics variation of the resistance by performing digital calculation processing. In addition, the difference between temperature characteristics of two currents remains as a result of performing the digital operation processing. Accordingly, it is possible to properly output temperature data based on the temperature characteristics. As described above, when the temperature characteristics of the first current $I_{REF}$ are flat, the temperature characteristics based on the second current $I_{PTAT}$ remain in the result of the digital operation processing.

2.3 Voltage Output Circuit

Next, the voltage output circuit 150 will be described. The voltage output circuit 150 outputs the first output voltage $V_{REF}$ based on the first current $I_{REF}$ and the second output voltage $V_{PTAT}$ based on the second current $I_{PTAT}$. As described above, when the first and second currents are respectively generated by the first and second current generating circuits, the voltage output circuit 150 may output, as the first output voltage $V_{REF}$, a voltage when the first current $I_{REF}$ generated by the first current generation circuit 181 flows in a resistance element, and output, as the second output voltage $V_{PTAT}$, a voltage when the second current $I_{PTAT}$ generated by the second current generation circuit 182 flows in a resistance element.

In this case, it is not necessary to simultaneously output both the first output voltage $V_{REF}$ and the second output voltage $V_{PTAT}$, and the first output voltage $V_{REF}$ and the second output voltage $V_{PTAT}$ may be output in a time division manner. Specifically, the voltage output circuit 150 may have a selection circuit that outputs a first current to a resistance element by selecting the first current during a first period, and a second current to a resistance element by selecting the second current during a second period. A selection circuit in the embodiment is, for example, transistors TC1 to TC4 in a case of FIGS. 7A and 7B described below. However, since transistors TC1 and TC2 correspond to the selection circuit in a case of examples of FIGS. 19A and 19B described below, it is possible to realize the selection circuit in the embodiment by various configurations.

Figure 6:
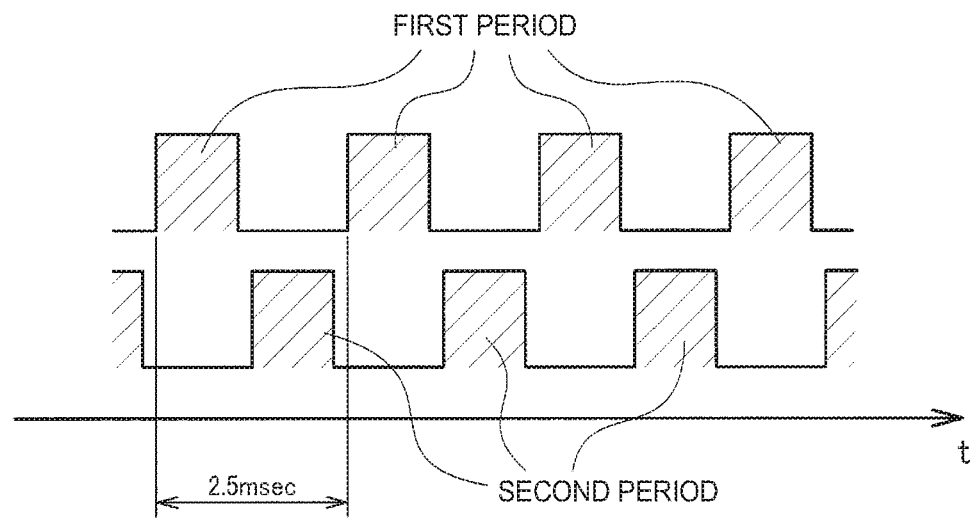
FIG. 6 is an example of a timing of a first period and a second period.

FIG. 6 illustrates an example of a specific timing. A horizontal axis of FIG. 6 represents time, an upper part of FIG. 6 represents a timing illustrating that the first current $I_{REF}$ is output to a resistance element, and a lower part thereof represents a timing illustrating that the second current $I_{PTAT}$ is output to a resistance element. As illustrated in FIG. 6, in the voltage output circuit 150, one of the first current $I_{REF}$ and the second current $I_{PTAT}$ may be exclusively output at a given timing. In this way, in a case where the output voltages of the two types are output, since it is not necessary to provide a plurality of the voltage output circuits 150 (in a narrow sense, resistance element, output node, or the like), and it is possible to suppress the size of a circuit. In FIG. 6, a first period and a second period are generated only in the same time in one cycle which is set 2.5 msec. However, the embodiment is not limited thereto. Various modifications can be implemented in the setting of the first period and the second period.

Figure 7A:
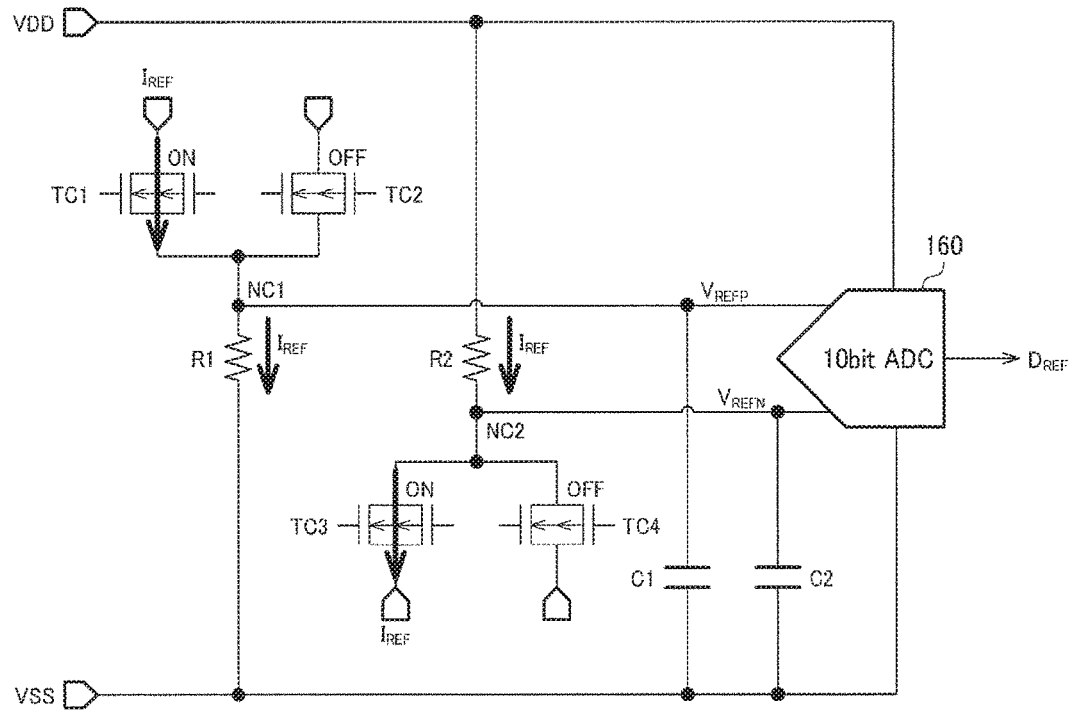
FIGS. 7A and 7B are examples of a configuration of a voltage output circuit.
Figure 7B:
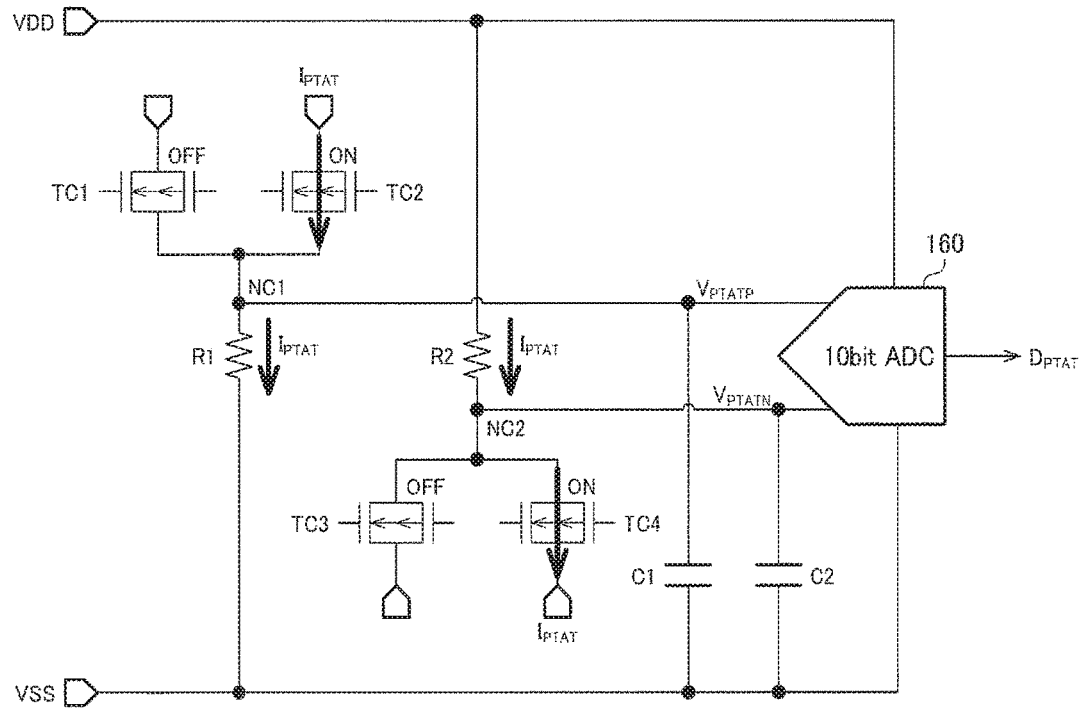

FIGS. 7A and 7B are examples of a configuration of the voltage output circuit 150. In addition, for convenience, FIGS. 7A and 7B are also described with respect to connection of the A/D conversion circuit 160. As illustrated in FIG. 7A, the voltage output circuit 150 includes the transistors TC1 to TC4 that function as switches, the resistance elements R1 and R2, and capacitors C1 and C2.

One end of the resistance element R1 is connected to the power supply voltage VSS. The other end thereof is connected to a drain of transistor TC1 and a drain of transistor TC2. A source of the transistor TC1 is connected to a drain of a transistor TA9 in FIG. 2. As described above, since the first current $I_{REF}$ corresponding to the current IA1 flowing in the resistance element RA1 flows in the transistor TA9, the first current $I_{REF}$ flows in the resistance element R1 through TC1 in a case where TC1 is turned on.

In addition, a source of the transistor TC2 is connected to a drain of the transistor TB9 in FIG. 3. As described above, since the second current $I_{PTAT}$ corresponding to the current IB1 flowing in the resistance element RB1 flows in the transistor TB9, the second current $I_{PTAT}$ flows in the resistance element R1 through TC2 in a case where TC2 is turned on.

In addition, one end of the resistance element R2 is connected to the power supply voltage VDD. The other end thereof is connected to a source of the transistor TC3 and a source of a transistor TC4. A drain of the transistor TC3 is connected to a source of the transistor TA10 in FIG. 2. As described above, since the transistor TA10 has a node that receives the first current $I_{REF}$, the first current $I_{REF}$ flows in the resistance element R2 through TC3 in a case where TC3 is turned on.

In addition, a drain of the transistor TC4 is connected to a source of the transistor TB10 in FIG. 3. As described above, since the transistor TA10 has a node that receives the second current $I_{PTAT}$, the second current $I_{PTAT}$ flows in the resistance element R2 through TC4 in a case where TC4 is turned on.

In addition, a node NC1 of TC1 and TC2 sides of the resistance element R1 is connected to one input node of the A/D conversion circuit 160. That is, a voltage value of the node NC1 is output to the A/D conversion circuit 160. In addition, the capacitor C1 for stabilization may be provided between the output node NC1 and a reference current VSS.

Similarly, a node NC2 of TC3 and TC4 sides of the resistance element R2 is connected to the other input node of the A/D conversion circuit 160. That is, a voltage value of the node NC2 is output to the A/D conversion circuit 160. In addition, the capacitor C2 for stabilization may be provided between the output node NC2 and the reference current VSS.

As described above, the first current $I_{REF}$ is output to a resistance element during the first period. That is, as illustrated in FIG. 7A, the transistors TC1 and TC3 may be turned on, and TC2 and TC4 may be turned off during the first period. In this case, the first current $I_{REF}$ flows in each of the resistance elements R1 and R2, and a voltage value $V_{REFP}$ of the node NC1 and a voltage value $V_{REFN}$ of the node NC2 are output to the A/D conversion circuit 160 as the first output voltage $V_{REF}$.

It is possible to obtain each of $V_{REFP}$ and $V_{REFN}$ by the following Equations (1) and (2). In an example of FIG. 7A, since the A/D conversion circuit 160 is a differential type A/D conversion circuit, the A/D conversion circuit 160 performs A/D conversion on $V_{REF}$ that is the difference between $V_{REFP}$ and $V_{REFN}$, and is obtained by following Equation (3).

$$V_{REFP} = I_{REF} R1 \quad (1)$$

$$V_{REFN} = V_{DD} - I_{REF} R2 \quad (2)$$

$$V_{REF} = I_{REF}(R1+R2) - V_{DD} \quad (3)$$

In addition, the second current $I_{PTAT}$ is output to a resistance element during the second period. That is, as illustrated in FIG. 7B, the transistors TC2 and TC4 may be turned on, and TC1 and TC3 may be turned off during the second period. In this case, the second current $I_{PTAT}$ flows in each of the resistance elements R1 and R2, and a voltage value $V_{PTATP}$ of the node NC1 and a voltage value $V_{PTATN}$ of the node NC2 are output to the A/D conversion circuit 160 as the second output voltage $V_{PTAT}$. Specifically, values of $V_{PTATP}$, $V_{PTATN}$, and $V_{PTAT}$ are the same as those of the above Equations (1) to (3), and can be obtained by the following Equations (4) to (6).

$$V_{PTATP} = I_{PTAT} R1 \quad (4)$$

$$V_{PTATN} = V_{DD} - I_{PTAT} R2 \quad (5)$$

$$V_{PTAT} = I_{PTAT}(R1+R2) - V_{DD} \quad (6)$$

In addition, it is possible to realize the resistance elements R1 and R2 included in the voltage output circuit 150 by various methods. For example, R1 and R2 may be realized by poly resistances (polysilicon resistance) which are widely known, and may be realized by well resistances.

The poly resistance uses, as a resistance, polysilicon that is used as gate electrode of MOS and is formed on a region other than a gate oxide film. Meanwhile, the well resistance uses, as a resistance, a well that is a region added with impurities. For example, the well in which an N-well is formed on a P-type substrate is used as an N-well resistance.

Figure 8A:
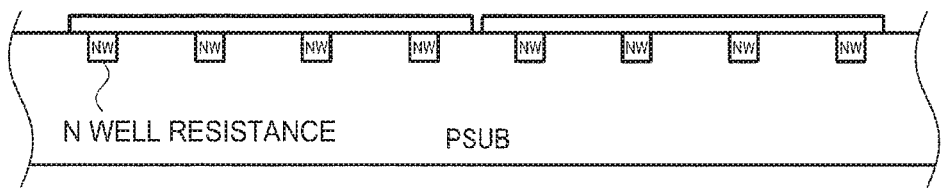
FIGS. 8A and 8B are a sectional view and a top view for explaining a structure of a well resistance.
Figure 8B:
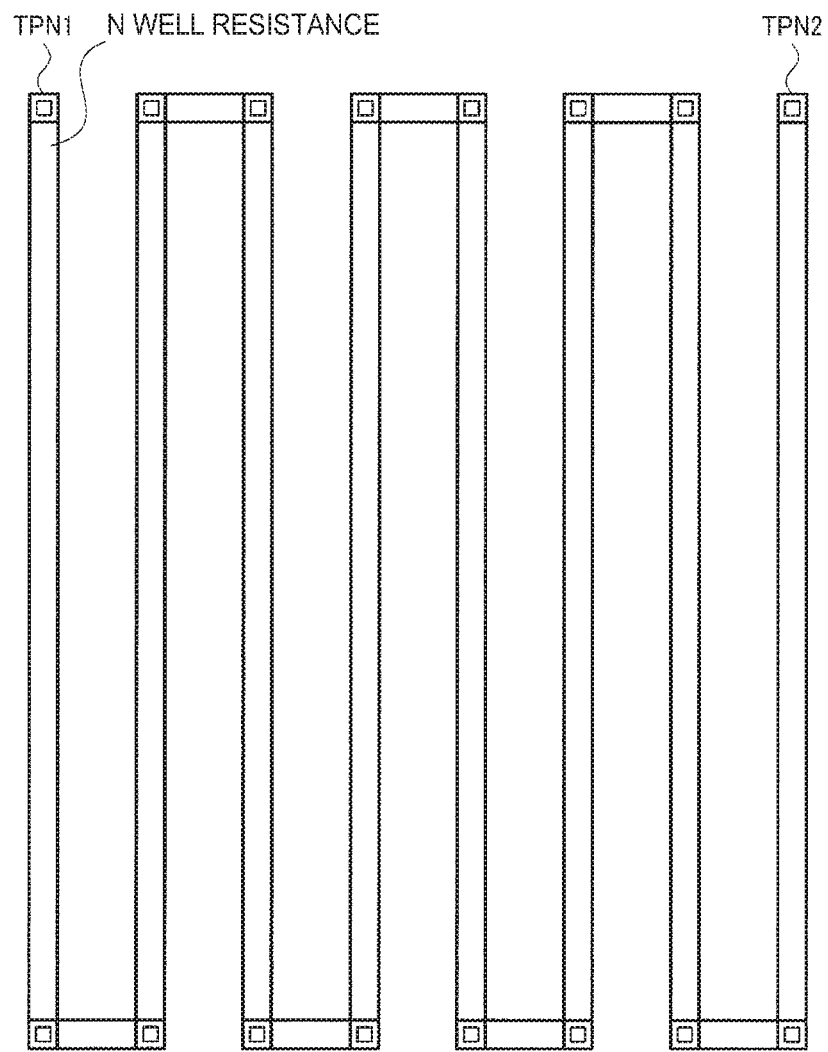

FIG. 8A illustrates a sectional view of a case of constituting the well resistance. As illustrated in FIG. 8A, a well resistance (N-well resistance in a case of FIG. 8A) uses an N-well region that is formed in the vicinity of a surface of a P-substrate. FIG. 8B illustrates a planar view of a configuration example of the well resistance. Since a resistance value depends on a width W and a length L, as illustrated in FIG. 8B, it is possible to efficiently form a well resistance of a desired resistance value, even in a case of a narrow region by forming an N-well region having a narrow width by folding back multiple times. In FIG. 8B, one end of the well resistance is a tap TPN1, and the other end thereof is a tap TPN2.

Figure 9A:
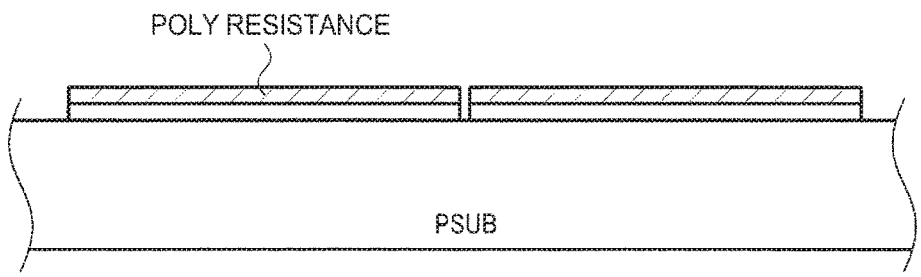
FIGS. 9A and 9B are a sectional view and a top view for explaining a structure of a poly resistance.
Figure 9B:
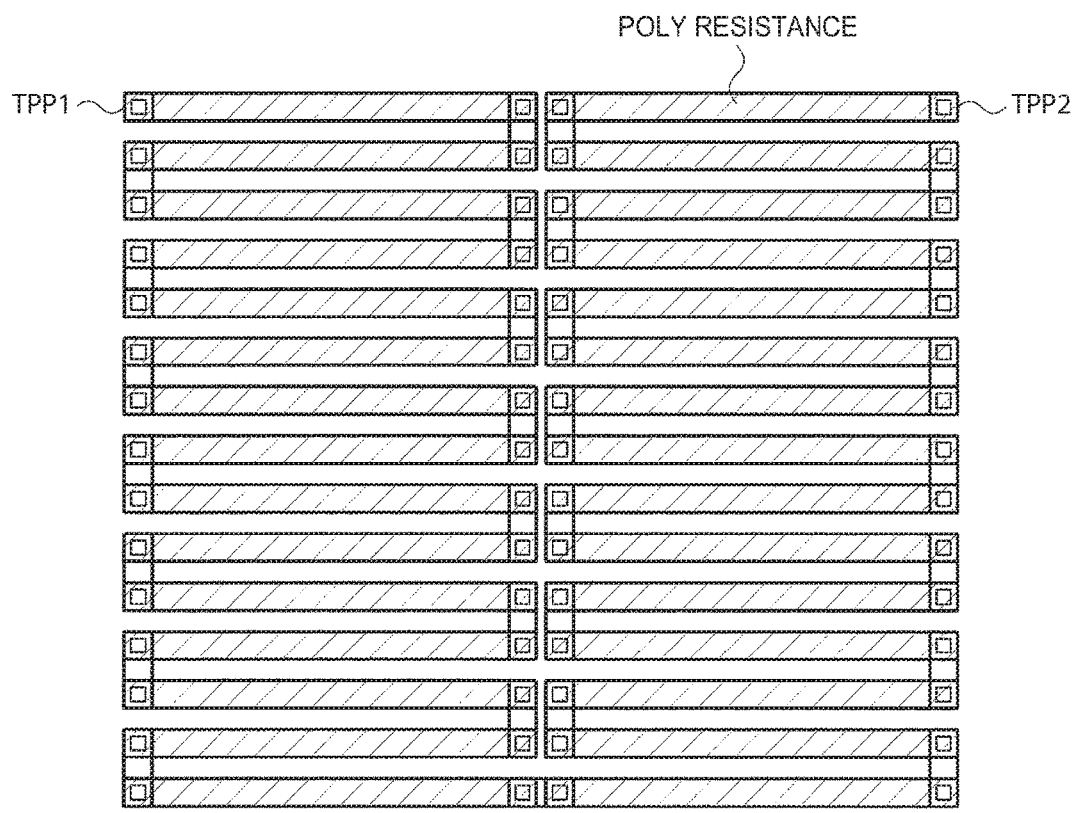

In addition, FIG. 9A illustrates a sectional view of a case of constituting the poly resistance. As illustrated in FIG. 9A, a poly silicon layer may be formed on a region (for example, a region illustrated in FIG. 9A) excluding a gate oxide film. FIG. 9B illustrates a planar view of an example of a configuration of the poly resistance. Similar to the well resistance, since a resistance value depends on a width W and a length L, as illustrated in FIG. 9B, it is possible to efficiently form a poly resistance with a desired resistance value, even in a case of a narrow region, by forming a poly silicon layer having a narrow width by folding back multiple times. In FIG. 9B, one end of the poly resistance is a tap TPP1, and the other end thereof is a tap TPP2.

Figure 10:
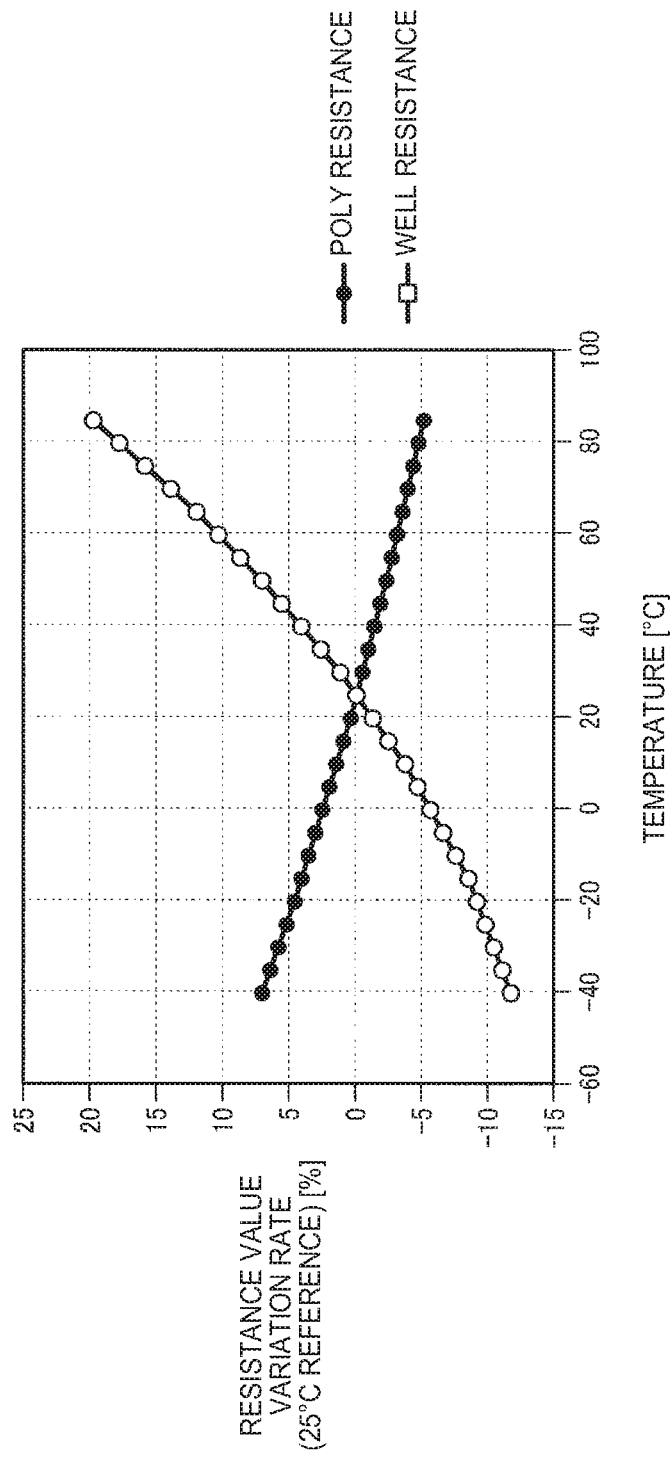
FIG. 10 is an example of the temperature characteristics of the well resistance and the poly resistance.

Here, the difference between the temperature characteristics of the poly resistance and the temperature characteristics of the well resistance will be described using FIG. 10. A horizontal axis of FIG. 10 represents temperature, and a vertical axis thereof represents a variation degree of the resistance value at each temperature in terms of percentage with respect to a resistance value at a given reference temperature. In addition, it is considered that as going up on the graph, the resistance value increases, and as going down on the graph, the resistance value decreases, in the vertical axis direction.

As known from FIG. 10, as the temperature of the poly resistance increases, the resistance value thereof decreases, and the poly resistance has negative temperature characteristics. On the other hand, it is considered that as the temperature of the well resistance increases, the resistance value thereof increases, and the well resistance has positive temperature characteristics.

Figures 11A, 11B:
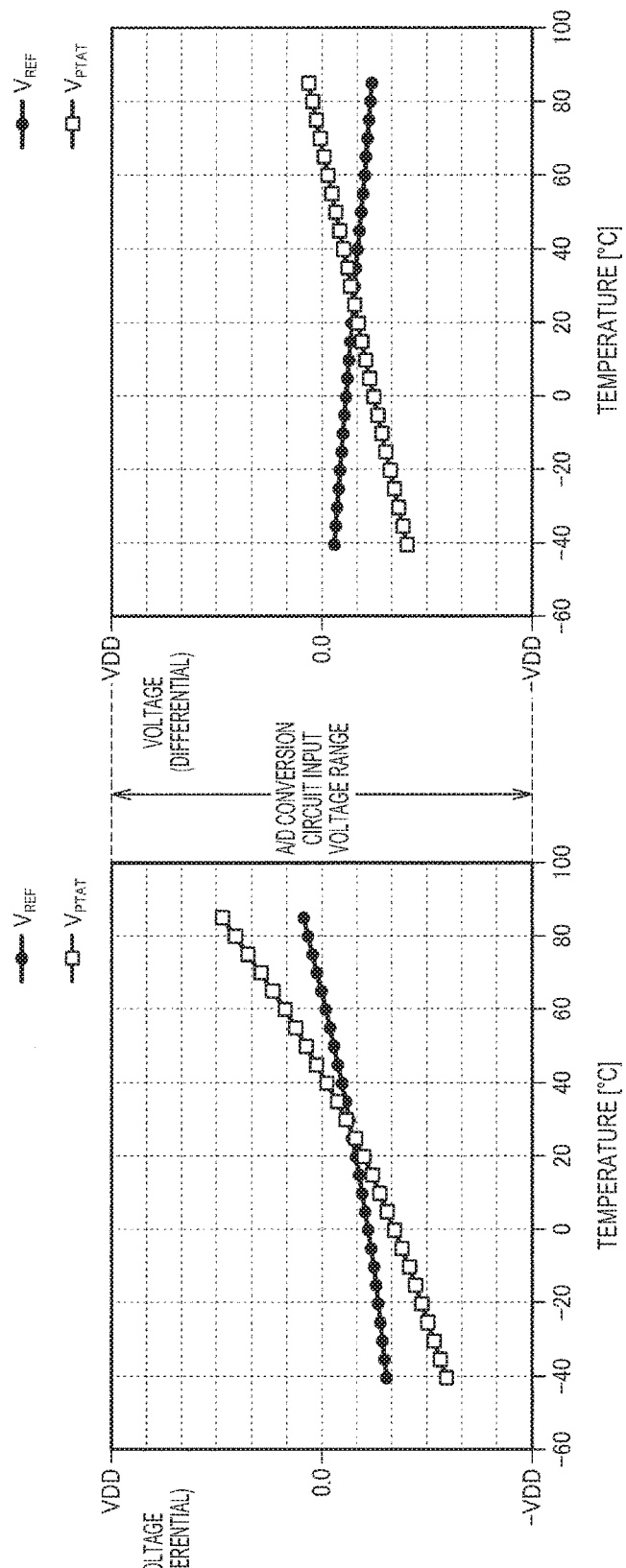
FIG. 11A is an example of the temperature characteristics of first and second output voltages in a case where the well resistance is used.
FIG. 11B is an example of the temperature characteristics of the first and second output voltages in a case where the poly resistance is used.

FIG. 11A illustrates the temperature characteristics of the first output voltage $V_{REF}$ and the second output voltage $V_{PTAT}$ in a case where the well resistance is used as resistance elements R1 and R2 of the voltage output circuit 150. As described above, the relationship between $V_{REF}$ and the resistance values R1 and R2 is represented as the above Equation (3), since $I_{REF}$ has flat temperature characteristics in a case where R1 and R2 have positive temperature characteristics, $V_{REF}$ also has positive temperature characteristics. However, magnitude of a slope with respect to temperature of $V_{REF}$ is not very large since the temperature is only affected by the positive slope (FIG. 10) of R1 and R2.

Since $I_{PTAT}$ has positive temperature characteristics in a case where the relationship between $V_{PTAT}$ and the resistance values R1 and R2 is represented as the above Equation (6), and R1 and R2 have positive temperature characteristics, $V_{PTAT}$ also has positive temperature characteristics. Further, magnitude of a slope with respect to temperature of $V_{PTAT}$ becomes a relatively large value due to influences of both the positive slope (FIG. 10) of R1 and R2 and the positive slope (FIG. 5) of $I_{PTAT}$.

FIG. 11B illustrates the temperature characteristics of the first output voltage $V_{REF}$ and the second output voltage $V_{PTAT}$ in a case where the poly resistance is used as resistance elements R1 and R2 of the voltage output circuit 150. As described above, the relationship between $V_{REF}$ and the resistance values R1 and R2 is represented as the above Equation (3), since $I_{REF}$ has flat temperature characteristics in a case where R1 and R2 have negative temperature characteristics, $V_{REF}$ also has negative temperature characteristics. However, magnitude of a slope with respect to temperature of $V_{REF}$ is not very large since the temperature is only affected by the negative slope (FIG. 10) of R1 and R2.

Since $I_{PTAT}$ has positive temperature in a case where the relationship between $V_{PTAT}$ and the resistance values R1 and R2 is represented as the above Equation (6), and R1 and R2 have negative temperature characteristics, the positive temperature characteristics and negative temperature characteristics of $V_{PTAT}$ also are offset. In an example of FIG. 11B, the influence of positive temperature characteristics of $I_{PTAT}$ is greater than the influence of negative temperature characteristics of R1 and R2, and $V_{PTAT}$ has positive temperature characteristics. In this case, since a positive slope (FIG. 5) of $I_{PTAT}$ is offset by a negative slope (FIG. 10) of R1 and R2, the magnitude of a slope with respect to temperature of $V_{PTAT}$ is small compared to at least the magnitude of a slope of $V_{PTAT}$ in a case where the well resistance illustrated in FIG. 11A is used.

In the embodiment, variation of resistance values of the resistance elements R1 and R2 or the influence on temperature data of temperature characteristics is reduced by digital calculation processing. In this sense, the resistance element may be realized by the poly resistance, and may be realized by the well resistance. However, it is preferable to greatly implement variation of a voltage value corresponding to temperature variation, that is, a slope, when considering resolution of digital data in A/D conversion. In examples of FIGS. 11A and 11B, since a case of FIG. 11A having a greater slope is further preferable, it is preferable to use the well resistance. A detailed reason will be described.

2.4 A/D Conversion Circuit

Next, the A/D conversion circuit 160 will be described in detail. As illustrated in FIGS. 7A and 7B, the A/D conversion circuit 160 may be a differential or SAR type A/D conversion circuit. Specific examples of the configuration of the A/D conversion circuit are known by various methods, each of the methods can be widely applied in the embodiment, and the detailed description thereof is not repeated.

The A/D conversion circuit 160 obtains the first digital value $D_{REF}$ by performing A/D conversion on the first output voltage $V_{REF}$, obtains the second digital value $D_{PTAT}$ by performing A/D conversion on the second output voltage $V_{PTAT}$, and outputs the first digital value $D_{REF}$ and the second digital value $V_{PTAT}$ that are obtained to the processing unit 170.

Specifically, the A/D conversion circuit 160 may be a differential A/D conversion circuit that receives a differential input signal configured with a first input signal and a second input signal, the voltage output circuit 150 may include the first resistance element R1 and the second resistance element R2 as a resistance element, and the voltage output circuit 150 may output, as a voltage of the first input signal, an output voltage $V_{REFP}$ generated when the first current $I_{REF}$ flows in the first resistance element R1 to the A/D conversion circuit 160, and may output, as a voltage of the second input signal, an output voltage $V_{REFN}$ generated when the first current $I_{REF}$ flows in the second resistance element R2 to the A/D conversion circuit 160, in a case where the first output voltage $V_{REF}$ is output. In addition, the voltage output circuit 150 may output, as a voltage of the first input signal, an output voltage $V_{PTATP}$ generated when the second current $I_{PTAT}$ flows in the first resistance element R1 to the A/D conversion circuit 160, and may output, as a voltage of the second input signal, an output voltage $V_{PTATN}$ generated when the second current $I_{PTAT}$ flows in the second resistance element R2 to the A/D conversion circuit 160, in a case where the second output voltage $V_{PTAT}$ is output. Since a specific configuration has described above by using FIGS. 7A and 7B, and Equations (1) to (6), further description is not repeated.

Here, a digital value $D_{OUT}$, is obtained by the following Equation (7), which is output of a case where $V_{INP}$ and $V_{INN}$ that are differential input signals, are input, in a case where the A/D conversion circuit 160 is a 10-bit A/D conversion circuit.

$$D_{OUT} = \{(V_{INP} - V_{INN})/2V_{DD}\} \times 2^{10} \qquad (7)$$
$$= (V_{diff}/V_{DD}) \times 2^{9}$$

In the above Equation (7), a voltage value of 2 $V_{DD}$ is an input voltage range (full scale range) in the A/D conversion, and corresponds to, for example, a case where $-V_{DD}$ is output as the minimum digital value (for example, −511) and $+V_{DD}$ is output as the maximum digital value (for example, +511) in FIG. 11A or the like. In addition, the input voltage range may be varied to another value.

In a case where the first digital value $D_{REF}$ is obtained by performing A/D conversion on the first output voltage $V_{REF}$, $V_{INP}$ in the above Equation (7) may be used as $V_{REFP}$ of the above Equation (1), $V_{INN}$ in the above Equation (7) may be used as $V_{REFN}$ of the above Equation (2), and as a result, $V_{REF}$ of the above Equation (3) may be used as $V_{diff}$. That is, it is possible to derive the below Equation (8) from the above Equations (3) and (7).

$$D_{REF} = \left(\frac{R1 + R2}{V_{DD}} I_{REF} - 1\right) \times 2^9 \qquad (8)$$

Similarly, in a case where the second digital value $D_{PTAT}$ is obtained by A/D conversion on the second output voltage $V_{PTAT}$, it is possible to use $V_{PTAT}$ of the above Equation (6) as $V_{diff}$, and derive the below Equation (9) from the above Equations (6) and (7).

$$D_{PTAT} = \left(\frac{R1 + R2}{V_{DD}} I_{PTAT} - 1\right) \times 2^9 \qquad (9)$$

Here, it is possible that the larger the amount of variation by temperature of voltage values (first and second output voltages) that are inputs of the A/D conversion circuit 160 is, the larger resolution of digital values (first and second digital values) that are outputs is. As described above, in the 10-bit A/D conversion circuit, a digital value is obtained by dividing an input voltage range corresponding to a full scale range into 1024 steps. That is, as the amount of voltage variation corresponding to temperature variation increases, variation of a digital value corresponding to the temperature variation increases, and it is possible to output a digital value that accurately reflects temperature characteristics. On the contrary, there is a possibility that a case occurs in which a digital value that is an output is not varied, regardless of variation of a voltage value with respect to temperature variation, when voltage variation amount is small with respect to temperature variation. Accordingly, resolution is lowered in this case.

As illustrated in FIGS. 10 to 11B, the amount of variation of the output voltage with respect to temperature variation, that is, a slope of the temperature characteristics is determined by temperature characteristics of currents (first current $I_{REF}$ and second current $I_{PTAT}$) and temperature characteristics of the resistance elements (R1 and R2). In a case where the first current $I_{REF}$ has flat temperature characteristics as described above, a slope of temperature characteristics of the first output voltage $V_{REF}$ obtained by outputting the first current $I_{REF}$ to the resistance elements R1 and R2 is determined by temperature characteristics of R1 and R2, and becomes a relatively small value as illustrated in FIGS. 11A and 11B.

That is, in a case where it is considered that resolution of A/D conversion is high, temperature characteristics of the second output voltage $V_{PTAT}$ obtained by outputting the second current $I_{PTAT}$ to resistance elements R1 and R2 is considered efficient. Accordingly, as illustrated in the above Equation (6), since the second output voltage $V_{PTAT}$ is a value obtained based on product of the second current $I_{PTAT}$ and the resistance values R1 and R2, it is considered that a slope is increased by making temperature characteristics of the second current $I_{PTAT}$ and the resistance elements R1 and R2 the same.

Specifically, the resistance elements (R1 and R2) are resistance elements having positive temperature characteristics in a case where the second current $I_{PTAT}$ has positive temperature characteristics, and are resistance elements having negative temperature characteristics in a case where the second current $I_{PTAT}$ has negative temperature characteristics. According to this, it is possible to increase the slope of the temperature characteristics because both temperature characteristics of the second current $I_{PTAT}$ and the resistance elements R1 and R2 are positive or negative. Specifically, the amount of voltage variation due to temperature variation in a case where temperature characteristics are made the same is greater than that of a case where respective characteristics are offset according to that the second current $I_{PTAT}$ has positive (negative) temperature characteristics and the resistance elements have negative (positive) temperature characteristics. Accordingly, it is possible to effectively use an input voltage range.

As described above using FIG. 3 to FIG. 5, it is considered that the second current $I_{PTAT}$ has positive temperature characteristics in the embodiment. Therefore, the resistance element may be realized by the well resistance. As described above, since the well resistance has positive temperature characteristics, it is possible to make the temperature characteristics of the second current $I_{PTAT}$ and temperature characteristics of the well resistance. In addition, a diffusion resistance that uses, as a resistance, a diffusion region formed by injecting impurity of a relatively high concentration on a silicon substrate may be used as the resistance element. It is known that the diffusion resistance has also positive temperature characteristics. Accordingly, it is possible to make the temperature characteristics of the second current $I_{PTAT}$ and temperature characteristics of the diffusion resistance the same.

2.5 Processing Unit

Figure 12:
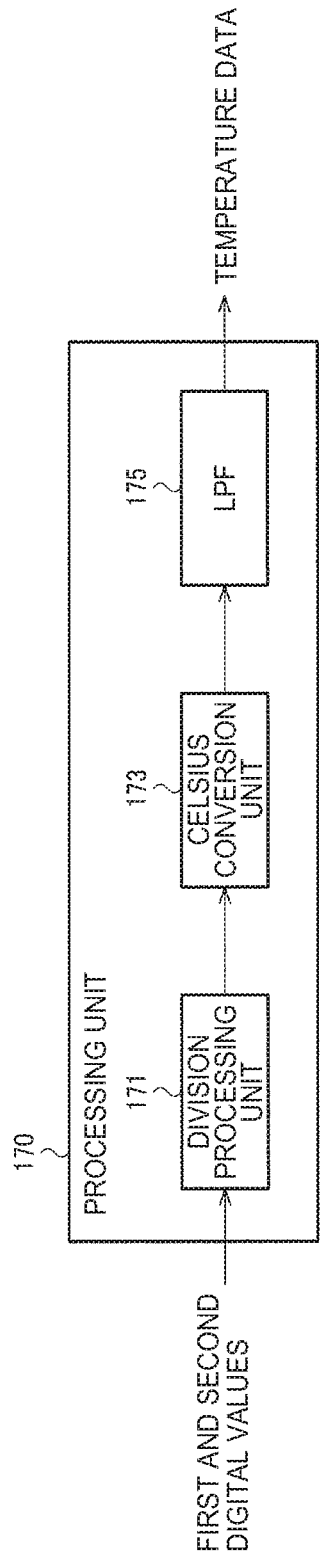
FIG. 12 is an example of a configuration of a processing unit.

FIG. 12 is an example of a detailed configuration of the processing unit 170. The processing unit 170 may include a division processing unit 171, a Celsius conversion unit 173, and an LPF 175. The processing unit 170, for example, may be realized by DSP. The DSP may perform division processing, Celsius conversion processing, and digital low-pass filter processing.

The processing unit 170 obtains the first digital value $D_{REF}$ and the second digital value $D_{PTAT}$ from the A/D conversion circuit 160. It is possible to obtain each digital value by the above Equations (1) to (9). It is required to output high accuracy temperature data in the processing unit 170 according to the embodiment. Accordingly, it is necessary to reduce the influence on temperature data of variation or temperature characteristics of resistance values of resistance elements R1 and R2, as described above.

Therefore, in the processing unit 170, a value that does not depend on the characteristics of the resistance elements R1 and R2 while having given temperature characteristics may be obtained by digital calculation processing using the above Equations (1) to (9). Specifically, an operation that erases R1 and R2 from the Equation (8) and the Equation (9) may be performed, and division processing of $I_{REF}$ and $I_{PTAT}$ may be performed in view of that (R1+R2) is a factor of the first current $I_{REF}$ and the second current $I_{PTAT}$ in each of the Equations (8) and (9). Particularly, since $I_{REF}$ and $I_{PTAT}$ are constant currents generated by the first current generation circuit 181 and the second current generation circuit 182, a result of the division processing of $I_{REF}$ and is suitable to output temperature data having a very small $I_{PTAT}$ influence of variations or the like, except temperature characteristics, and having high accuracy.

Accordingly, the processing unit 170 of the embodiment may obtain the temperature data by digital operation processing including division processing that divides the second digital value $D_{PTAT}$ by the first digital value $D_{REF}$. Here, the division processing is performed by, for example, a division processing unit 171 of FIG. 12.

Specifically, it is possible to derive the following Equation (10) from the above Equations (8) and (9). In addition, as understood from the above Equation (7), $2^9$ in the following Equation (10) is a constant determined by the number of bits and the full scale range in the A/D conversion.

$$I_{PTAT}/I_{REF} = (D_{PTAT}+2^9)/(D_{REF}+2^9) \tag{10}$$

Accordingly, in a case where the first digital value is set to $D_{REF}$, the second digital value is set to $D_{PTAT}$, and a given constant is set to m when generalizing the above Equation (10), the processing unit 170 performs processing that calculates $(D_{PTAT}+m)/(D_{RF}+m)$, as the division processing. As described above, when the number of bits and the full scale range are varied in the A/D conversion, a value of m is also varied. In addition, as described below using FIGS. 19A and 19B and the following Equations (15) to (20), m=0 is satisfied regardless of the number of bits of the A/D conversion and the full-scale range, when the A/D conversion circuit 160 is a single-ended type. That is, here, m may be 0, and may be a constant other than 0.

The Celsius conversion unit 173 converts a value obtained by the above equation (10) to Celsius temperature. For example, Celsius temperature (offset value) is B in a state (state where division result=1) where $I_{PTAT}$ is equal to $I_{REF}$ and Celsius temperature data can be obtained by (division result−1)×A+B in a case where a slope variable is A. That is, here, A is a slope that defines the relationship between a variation rate with respect to $I_{REF}$ of $I_{PTAT}$ and a variation rate of the Celsius temperature.

The processing unit 170 may obtain other type temperature in other units such as Fahrenheit and the like rather than Celsius. Alternatively, modifications that output a division result, without performing variation to a particular temperature format, can be implemented.

In addition, the processing unit 170 may perform digital low-pass filter processing on temperature data obtained by digital calculation processing. As an example, the processing unit 170 may include the LPF 175 that performs the digital low-pass filter processing.

As described above using FIG. 11, a slope of voltage with respect to temperature variation is relatively small, while $V_{REF}$ has temperature characteristics corresponding to the temperature characteristics of the resistance element, in a case where $I_{REF}$ has flat temperature characteristics. As a result, there is a possibility where a case is generated that the first digital value $D_{REF}$ obtained from $V_{REF}$ has small resolution of the A/D conversion and a digital value that is an output is not varied regardless of variation of a voltage value with respect to temperature variation in fact. In other words, $D_{REF}$ is likely to cause quantization noise.

Figure 13A:
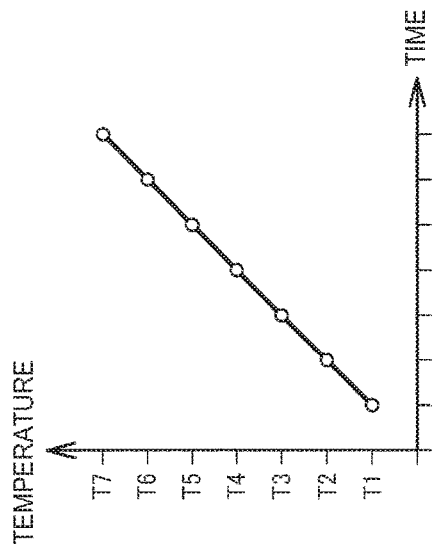
FIGS. 13A to 13D are diagrams for explaining the influence of quantization noise on A/D conversion.

Therefore, as illustrated in the above Equation (10), since $D_{REF}$ is a value that is the denominator of the division process, there is a possibility that the division result is greatly varied, even in a case where $D_{REF}$ varies only by one least significant bit (LSB). For example, it is considered that an actual temperature and a value of $D_{REF}$ are in a relationship as illustrated in FIG. 13A. In FIG. 13A, a horizontal axis is temperature, and a vertical axis is $D_{REF}$ values. In an example of FIG. 13A, $D_{REF}$ is a first value d1 in a range of temperature equal to or less than T4 (at least T1 to T4), $D_{REF}$ is a second value d2 in a range of equal to or greater than T5 (at least T5 to T7), and d2 is larger by one LSB compared to d1.

Figure 13B:
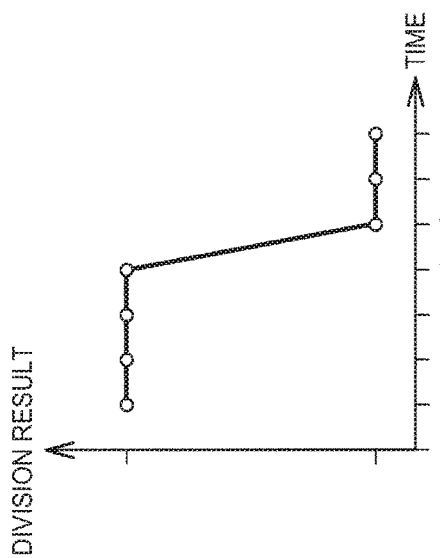

In a case of FIG. 13A, as illustrated in FIG. 13B, a case is considered where the actual temperature according to variation of time gradually increases. In this case, since $D_{REF}$ acts as illustrated in FIG. 13A, variation of $D_{REF}$ with respect to time variation is the same as that of FIG. 13C. That is, in fact, the temperature is smoothly (linearly) changed, and $D_{REF}$ is varied in a stepwise manner as illustrated in FIG. 13C, even in a case where $D_{REF}$ (and temperature data obtained from $D_{REF}$) smoothly varying as illustrated in FIG. 13B is expected.

Figure 13C:
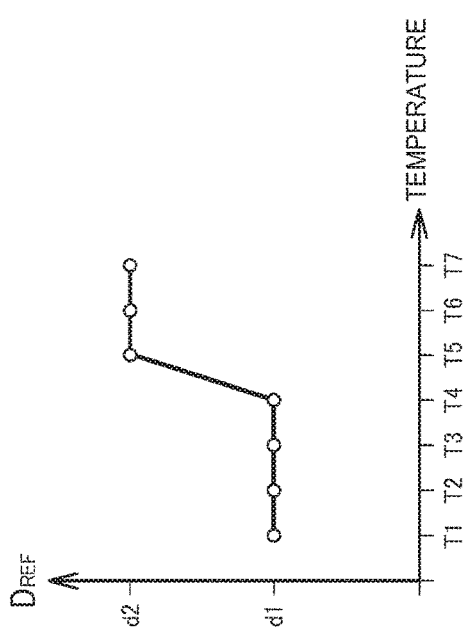
Figure 13D:
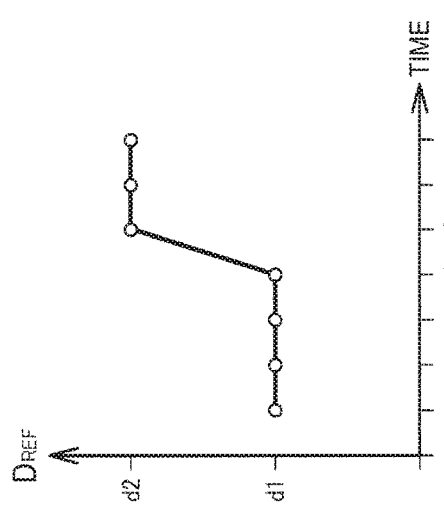

Accordingly, as illustrated in FIG. 13C, since division processing is performed where $D_{REF}$ is the denominator, the division result, as illustrated in FIG. 13D, is varied in a stepwise manner, and the amount of variation is increased in some cases. That is, even in a case where original temperature variation is smoothly varied as illustrated in FIG. 13B, the temperature data obtained by the processing unit 170 has singularity between a timing t1 and a timing t2 in FIGS. 13C and 13D, that is, between temperature T4 and temperature T5 in FIG. 13B where $D_{REF}$ is varied in a stepwise manner, compared to other regions.

Digital low-pass filtering processing according to the embodiment is to reduce the influence of the singularity. Specifically, low-pass filter processing having very low cut-off frequency may be performed. It is possible to extract DC components, that is, reduce temporal variation of the division result, and reduce (to smooth variation) a specific variation as illustrated between t1 and t2 in FIG. 13D, by greatly lowering the cut-off frequency.

Here, although filters of different types are applicable to the LPF 175, the LPF 175 may use, for example, a first-order low-pass filter in some cases. In addition, the following Equation (11) as a transfer function H of the first-order low-pass filter is known. In addition, a transfer function H of a case where the following Equation (11) is converted into bilinear transformation becomes the following Equation (12). Further, in the following Equation (12), s is a Laplace variable, $f_s$ represents a sampling frequency in a case where discrete processing is performed, b is a coefficient obtained by the following Equation (14) using a cut-off frequency $f_C$, and g is a normalization gain factor obtained by the following Equation (13).

$$H_{LPF}(z) = g \frac{1 + z^{-1}}{1 + bz^{-1}} \tag{11}$$

$$H_{LPF}(s) = \frac{1}{1 + \frac{1}{2f_s} \frac{1-b}{1+b} s} \tag{12}$$

$$g = \frac{1+b}{2} \tag{13}$$

$$b = \frac{f_s - \pi f_c}{f_s + \pi f_c} \tag{14}$$

That is, when the coefficient b is obtained by the above Equation (14), it is possible to reduce specific variation of the division result by realizing a digital filter (in a narrow sense, IIR type digital low-pass filter) which corresponds to the above Equation (12) using the obtained coefficient b. In addition, since the sampling frequency $f_s$ can be determined by a specification of the circuit apparatus 20, it is possible to obtain the coefficient b by determining the cut-off frequency $f_C$. As described above, since the low-pass filter of the embodiment has only to remove AC components and extract DC components, the cut-off frequency $f_C$ may be very low, and may be a value such as 1 Hz.

However, when the cut-off frequency $f_C$ is excessively small, followability of division result with respect to the actual temperature variation (and temperature data obtained therefrom) is deteriorated. Therefore, in a case where temperature data is used in the correction of physical quantity in a physical quantity detection device (gyro sensor) to be described below, there is a possibility that correction accuracy of the physical quantity is lowered. That is, since the cut-off frequency $f_C$ has characteristics that the followability corresponding to temperature variation is deteriorated when the cut-off frequency is low and the influence of quantization noise of $D_{REF}$ is increased when the cut-off frequency is high, it is necessary to adjust to an appropriate value.

Accordingly, the processing unit 170 may perform digital low-pass filtering using a variable cut-off frequency $f_C$ with respect to temperature data obtained by the digital calculation processing.

As an example, the cut-off frequency $f_C$ may be varied according to whether or not utilization in a case of abruptly varying temperature variation. In a case of abruptly varying temperature variation, since division result (temperature data) follows the temperature variation, it is preferable that the cut-off frequency $f_C$ becomes a relatively large value. On the contrary, in a case where the temperature variation is not so much, since it is not necessary to emphasize the followability, reduction of influence of the quantization noise of $D_{REF}$ is emphasized, and the cut-off frequency $f_C$ becomes a relatively small value.

Alternatively, the processing unit 170 may set the cut-off frequency $f_C$ to a first frequency in a first period after starting, and may set the cutoff frequency $f_C$ to a second frequency lower than the first frequency in the second period after the first period.

For example, this is effective in a case of realizing the physical quantity detection device such as the gyro sensor including the circuit apparatus 20 in the embodiment. In the gyro sensor or the like, it is necessary to reduce the value of the drift (starting drift) at the time of starting. Accordingly, in order to output highly accurate physical quantity data (angular velocity), it is preferable to perform correction processing according to temperature data by outputting the temperature data that become stable immediately after starting the physical quantity detection device. To do this, a result of the digital low-pass filtering may set cut-off frequency $f_C$ that converges on a stable value as soon as possible, and a first frequency after starting may be a relatively large value. Specifically, it is possible to output physical quantity data with constant accuracy by using a relatively high cut-off frequency in the first period after starting the physical quantity detection device, and by varying the cut-off frequency to a relatively low value after a given period has elapsed, even immediately after the physical quantity detection device is started (first period where elapsed time from starting is shorter). In addition, here, the "starting" includes not only transition from a state where a power source such as the physical quantity detection device, the electronic apparatus, and the like are completely turned off to a turn on state, but also returning from a sleep state to a normal operation state. Broadly, transition from a state in which outputting of the physical quantity data or the temperature data is not performed, to a state in which the physical quantity data or the temperature data is output, is included in the "starting" in the embodiment.

2.6 Physical Quantity Detection Device, Electronic Apparatus, and Moving Object

In addition, the circuit apparatus 20 of the embodiment may include a detection circuit 60 that outputs physical quantity data corresponding to physical quantity, and a drive circuit 30 that drives the physical quantity transducer, based on a detection signal corresponding to the physical quantity output from a physical quantity transducer 18. Accordingly, the processing unit 170 may perform correction processing based on the temperature data with respect to the physical quantity data from the detection circuit 60.

By doing so, it is possible to perform temperature correction of the physical quantity data, and to increase accuracy of the physical quantity data to be output, by using highly accurate temperature data obtained by a method described above.

Figure 14:
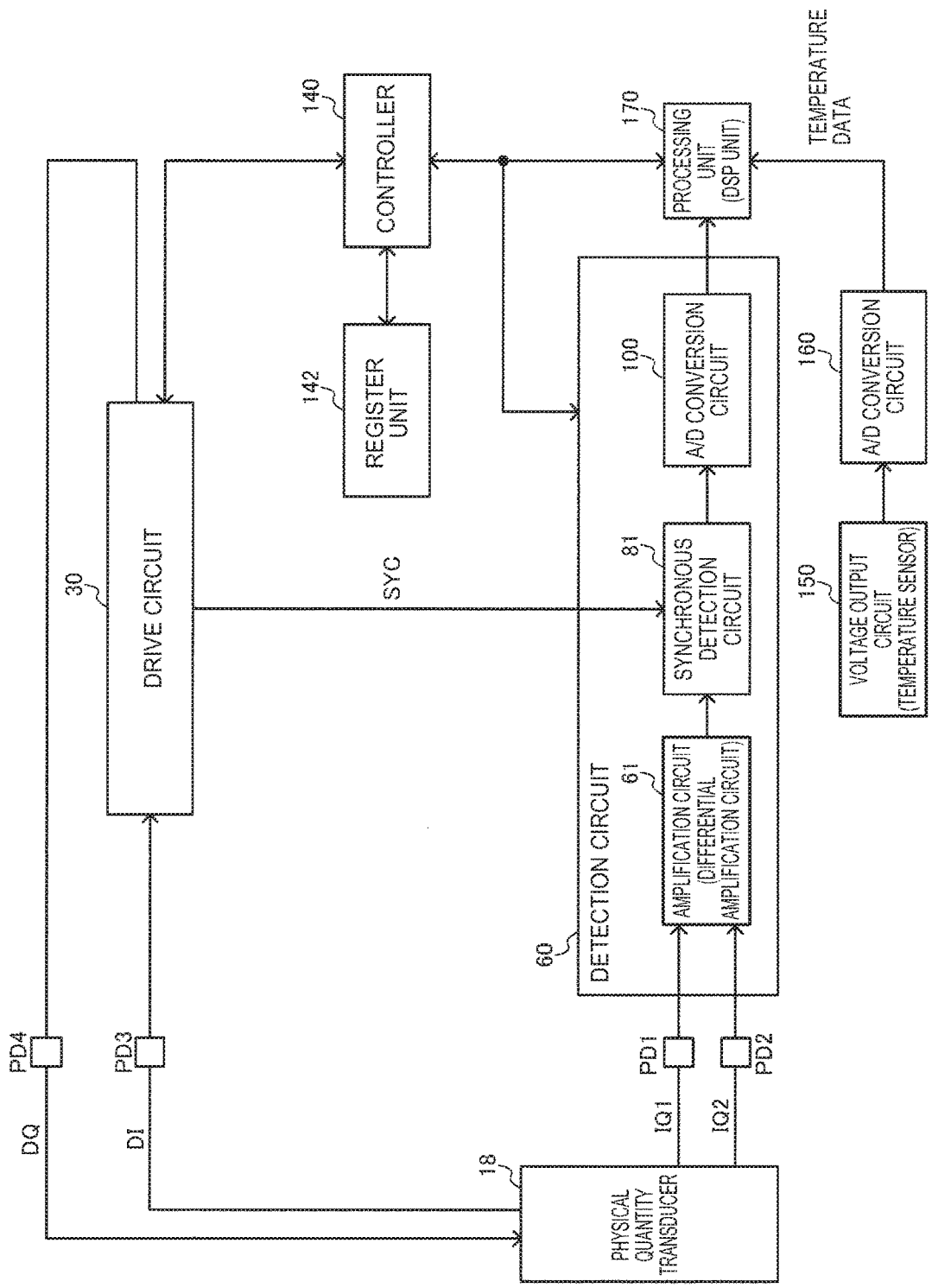
FIG. 14 is an example of a configuration of an overall system of the circuit apparatus.

FIG. 14 is an example of a configuration of an overall system of the circuit apparatus 20 of the embodiment. The circuit apparatus 20 of FIG. 14 includes the drive circuit 30, the detection circuit 60, a controller 140, and a register unit 142, in addition to the voltage output circuit 150, the A/D conversion circuit 160, and the processing unit 170 described above. However, the circuit apparatus 20 is not limited to the configuration of FIG. 14, and various modification examples such as the omission of part of the components or the addition of other elements can be implemented.

As described in FIG. 14, the circuit apparatus includes the drive circuit 30 that drives the physical quantity transducer 18. The drive circuit 30, for example, drives the physical quantity transducer 18 by receiving a feedback signal DI from the physical quantity transducer 18, and by outputting a drive signal DQ corresponding to the feedback signal DI. For example, first and second detection signals IQ1 and IQ2 from the physical quantity transducer 18 are input to the detection circuit 60 of the circuit apparatus through terminals PD1 and PD2 (pad). In addition, the feedback signal DI from the physical quantity transducer 18 is input to the drive circuit 30 of the circuit apparatus through a terminal PD3 (pad), and the drive circuit 30 outputs the drive signal DQ to the physical quantity transducer 18 through a terminal PD4 (pad).

The detection circuit 60 includes an amplification circuit 61, a synchronous detection circuit 81, and an A/D conversion circuit 100. The amplification circuit 61, for example, may be a differential amplification circuit. The circuit apparatus of the embodiment includes the drive circuit 30 that drives the physical quantity transducer 18, and the detection circuit 60 that receives the first and second detection signals IQ1 and IQ2 from the physical quantity transducer 18. In addition, the detection circuit 60 of FIG. 14 is configured with first and second amplifiers, and includes the differential amplification circuit that receives first and second signals QB1 and QB2 corresponding to the first and second detection signals IQ1 and IQ2. However, the detection circuit 60 is not limited thereto, and various modification examples can be implemented.

The controller 140 performs a variety of control processing. For example, the controller 140 performs control processing of the drive circuit 30 and control processing of the detection circuit 60. The controller 140 can be realized by a logic circuit such as a gate array generated by an automatic placement and routing method, a processor or the like which is operated based on a firmware, or the like. In addition, both the controller 140 and the processing unit 170 may be generated by the automatic placement and routing method, such as a gate array. However, the invention is not limited thereto, and the controller 140 and the processing unit 170 may be generated by different processing.

The register unit 142 has a register in which a variety of information is set. The register unit 142, for example, can be realized by a memory such as SRAM, a flip-flop circuit, or the like.

Figure 15:
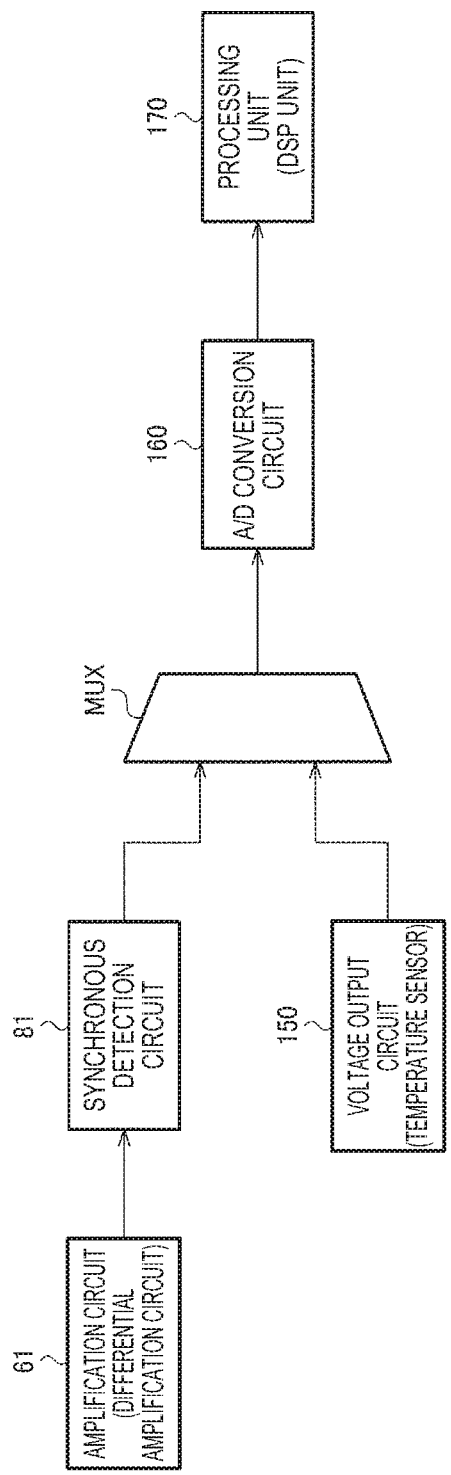
FIG. 15 is an example of a configuration of another overall system of the circuit apparatus.

In addition, an A/D conversion circuit 100 different from the A/D conversion circuit 160 described above is provided in FIG. 14. However, the invention is not limited thereto. One A/D conversion circuit may be used in A/D conversion for temperature data and A/D conversion for physical quantity data in a time division manner. FIG. 15 illustrates an example of another configuration of the detection circuit 60 and the processing unit 170. As illustrated in FIG. 15, the circuit apparatus 20 may additionally include a multiplexer MUX, and may omit the A/D conversion circuit 100 different from the A/D conversion circuit 160, in a case compared to the configuration of FIG. 14. In this case, the voltage output circuit 150 is connected to the multiplexer MUX, and the multiplexer MUX outputs a signal to the A/D conversion circuit 160 by selecting one of an input (signal corresponding to physical quantity detected by physical quantity transducer 18) from the synchronous detection circuit 81 and an output voltage from the voltage output circuit 150. In this case, since it is assumed that the A/D conversion circuit 160 is used in the time division manner as described above, for example, the SAR type A/D conversion circuit may be used. In addition, modifications similar to FIG. 15 with respect to the A/D conversion circuit are also the same as those of other drawings or the like described in the embodiment such as FIG. 16, FIG. 17, and the like described below.

In a case of FIG. 14 and FIG. 15, the processing unit 170 obtains both the physical quantity data by the physical quantity transducer and the temperature data by a temperature sensor (voltage output circuit 150, in a narrow sense) and performs processing on the obtained data.

Figure 16:
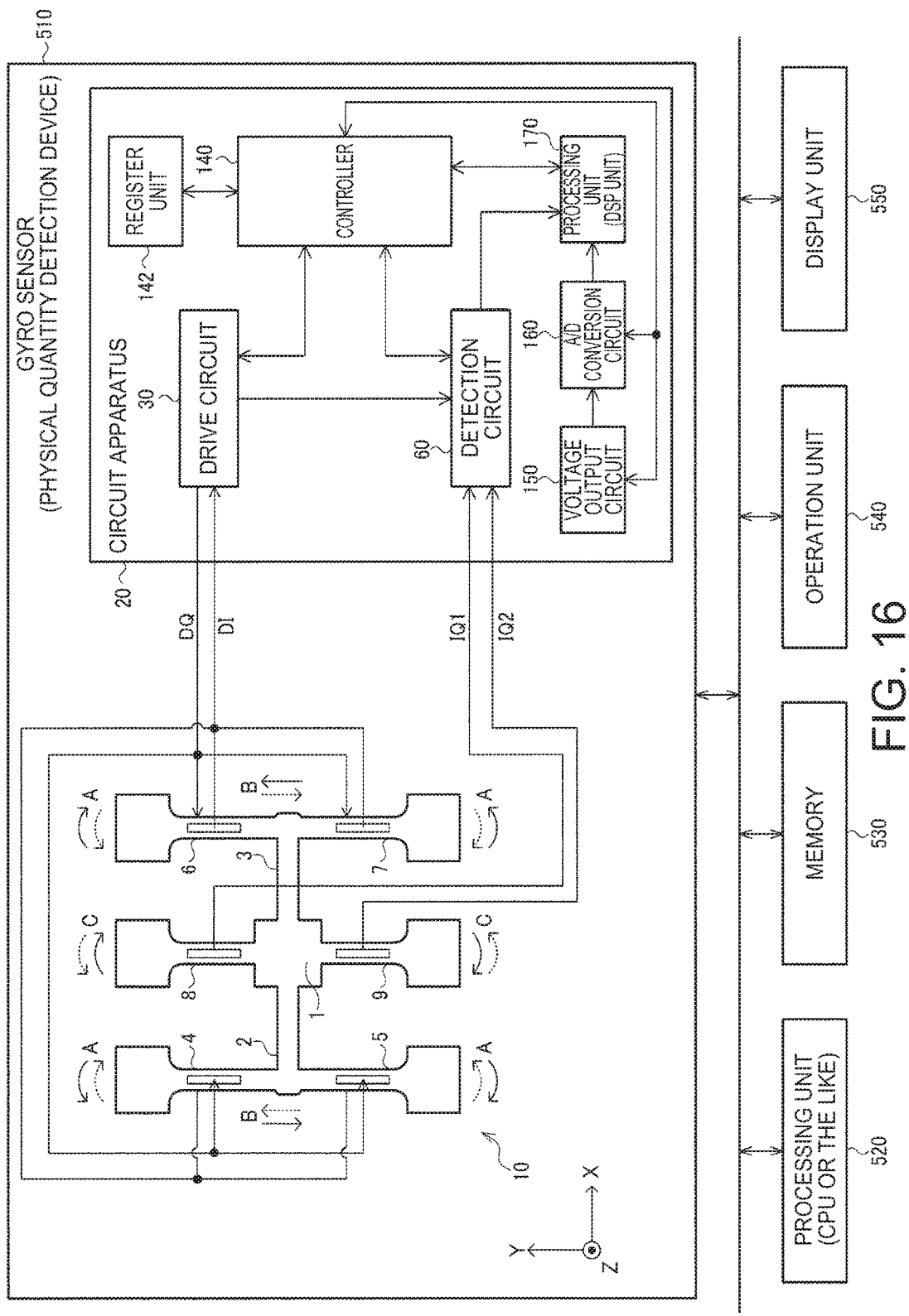
FIG. 16 is an example of a configuration of the circuit apparatus, an electronic apparatus, a gyro sensor (physical quantity detection device) according to the embodiment.

In addition, a method of the embodiment can apply to the physical quantity detection device including the circuit apparatus or the electronic apparatus including the circuit apparatus. FIG. 16 illustrates an example of a detailed configuration of the circuit apparatus 20, a gyro sensor 510 (broadly, physical quantity detection device) including the circuit apparatus 20, and an electronic apparatus 500 including the gyro sensor 510 of the embodiment.

In addition, without limiting the circuit apparatus 20, the electronic apparatus 500, and the gyro sensor 510 to the configuration in FIG. 16, various modification examples such as the omission of part of the components thereof or the addition of other elements can be implemented. In addition, it is possible as the electronic apparatus 500 of the embodiment to assume the form of various devices such as digital cameras, video cameras, smart phones, mobile phones, vehicle navigation systems, robotics, biological information detection devices, game machines, watches, health appliances, portable information terminals, and the like. In addition, hereinafter, a case where the physical quantity transducer is a piezoelectric type oscillation element (oscillation gyro), and the sensor is the gyro sensor is described as an example. However, the invention is not limited thereto. For example, it is possible to apply the invention to an oscillation gyro of an electrostatic capacitance detection method formed of a silicon substrate or the like, a physical quantity transducer for detecting physical quantity equivalent to the angular velocity information or physical quantity other than the angular velocity information, or the like.

The electronic apparatus 500 includes the gyro sensor 510 and a processing unit 520. Here, it is assumed that the processing unit 520 constitutes the electronic apparatus 500 and has a different configuration from the processing unit 170 included in the circuit apparatus 20. In addition, it is possible for the electronic apparatus 500 to include a memory 530, an operation unit 540, and a display unit 550. The processing unit 520 (controller) realized by CPU, MPU, or the like performs control of the gyro sensor 510, or the like or whole control of the electronic apparatus 500. In addition, the processing unit 520 performs processing based on the angular velocity information (broadly, physical quantity) detected by the gyro sensor 510. For example, processing for image stabilization, posture control, GPS autonomous navigation, or the like is performed based on the angular velocity information. The memory 530 (ROM, RAM, or the like) stores control programs or various data and functions as a work area or a data storage area. The operation unit 540 is to operate the electronic apparatus 500 by a user, and the display unit 550 displays a variety of information to the user.

The gyro sensor 510 (physical quantity detection device) includes the oscillation element 10 and the circuit apparatus 20. The oscillation element 10 (broadly, physical quantity transducer) is a piezoelectric type oscillation element formed from a thin plate of a piezoelectric material such as quartz crystal. Specifically, the oscillation element 10 is a double T-shaped oscillation element formed by a Z-cut quartz crystal substrate.

The circuit apparatus 20 includes the drive circuit 30, the detection circuit 60, the controller 140, the register unit 142, the voltage output circuit 150, the A/D conversion circuit 160, and the processing unit 170. In addition, various modification examples such as the omission of part of the components or the addition of other elements can be implemented.

The drive circuit 30 drives the oscillation element 10 by outputting the drive signal DQ. For example, a feedback signal DI is received from the oscillation element 10, the drive signal DQ corresponding to the received signal is output, and the oscillation element 10 is excited. The detection circuit 60 receives the detection signals IQ1 and IQ2 (detection current and charge) from the oscillation element 10 driven by the drive signal DQ, and detects (extracts) a desired signal (Coriolis force signal), from the detection signals IQ1 and IQ2, corresponding to the physical quantity applied to the oscillation element 10.

The oscillation element 10 includes a base 1, connection arms 2 and 3, drive arms 4, 5, 6, and 7, and detection arms 8 and 9. The detection arms 8 and 9 are extended in the +Y axis direction and the −Y axis direction with respect to the base 1 of a rectangular shape. In addition, the connection arms 2 and 3 are extended in the −X axis direction and the +X axis direction with respect to the base 1. The drive arms 4 and 5 are extended in the +Y axis direction and the −Y axis direction with respect to the connection arm 2, and the drive arms 6 and 7 are extended in the +Y axis direction and the −Y axis direction with respect to the connection arm 3. In addition, X axis, Y axis, and Z axis represent the axes of crystal, and are referred to as an electric axis, a mechanical axis, and an optical axis, respectively.

The drive signal DQ from the drive circuit 30 is input to a drive electrode provided on an upper surface of the drive arms 4 and 5, and a drive electrode provided on a side surface of the drive arms 6 and 7. In addition, signals from a drive electrode provided on a side surface of the drive arms 4 and 5, and a drive electrode provided on an upper surface of the drive arms 6 and 7 are input to the drive circuit 30 as a feedback signal DI. In addition, signals from a detection electrode provided on an upper surface of the detection arms 8 and 9 are input to the detection circuit 60 as the detection signals IQ1 and IQ2. In addition, a common electrode provided on a side surface of the detection arms 8 and 9 is, for example, grounded.

When AC drive signal DQ is applied by the drive circuit 30, bending vibration (vibration excitation) as illustrated by an arrow A is caused in the drive arms 4, 5, 6, and 7 by inverse piezoelectric effect. That is, the bending vibration is performed in which the tip parts of the drive arms 4 and 6 repeatedly perform approach toward and separation from each other, and the tip parts of the drive arms 5 and 7 repeatedly perform approach toward and separation from each other. At this time, since line symmetrical vibration is performed in the drive arms 4 and 5 and the drive arms 6 and 7 with respect to the Y axis that passes through a position of the center of gravity of the base 1, the base 1, the connection arms 2 and 3, and the detection arms 8 and 9 are hardly vibrated.

In this state, when angular velocity of the Z axis as a rotation axis is applied with respect to the oscillation element 10 (when oscillation element 10 is rotated around Z axis), the drive arms 4, 5, 6, and 7 are vibrated as illustrated by an arrow B by a Coriolis force. That is, the Coriolis force in the arrow B direction orthogonal to the arrow A direction and the Z axis direction acts on the drive arms 4, 5, 6, and 7, and thereby a vibration component is generated in the arrow B direction. Vibration of the arrow B is transmitted to the base 1 through the connection arms 2 and 3, and the bending vibration is generated to the detection arms 8 and 9 in the arrow C direction. A charge signal generated by a piezoelectric effect caused by the bending vibration of the detection arms 8 and 9 is input to the detection circuit 60 as the detection signals IQ1 and IQ2. Here, the vibration of the arrow B of the drive arms 4, 5, 6, and 7 is generated in the circumferential direction with respect to the position of the center of gravity of the base 1, and the vibration of the detection arms 8 and 9 is generated in the arrow C direction, opposite to the arrow B direction which is the circumferential direction. The detection signals IQ1 and IQ2 are signals in which a phase is deviated by 90° with respect to the drive signal DQ.

For example, when angular velocity of the oscillation element 10 (gyro sensor) around the Z axis is ω, mass is m, and vibration speed is v, the Coriolis force is represented as Fc=2 m·v·ω. Accordingly, it is possible for the detection circuit 60 to obtain an angular velocity ω by detecting a desired signal that is a signal corresponding to the Coriolis force. Therefore, it is possible for the processing unit 520 to perform a variety of processing such as image stabilization, posture control, GPS autonomous navigation, or the like, by using the obtained angular velocity ω.

In addition, FIG. 16 illustrates an example of a case where the oscillation element 10 is a double T shape. However, the oscillation element 10 of the embodiment is not limited to a configuration of this case. For example, the oscillation element may be the shape of a tuning fork, an H shape, or the like. In addition, the piezoelectric material of the oscillation element 10 may be a material of ceramics, silicon, or the like other than the crystal.

As described above, in the circuit apparatus of the embodiment, the physical quantity transducer 18 driven by the drive circuit 30 may be the oscillation element 10, and the physical quantity data (detection data) may be angular velocity data. In this way, it is possible to use angular velocity data in which highly accurate correction processing is performed based on appropriate temperature data, and it is possible to perform highly accurate processing in a variety of equipment described below using, for example, FIGS. 18A to 18D.

Figure 17:
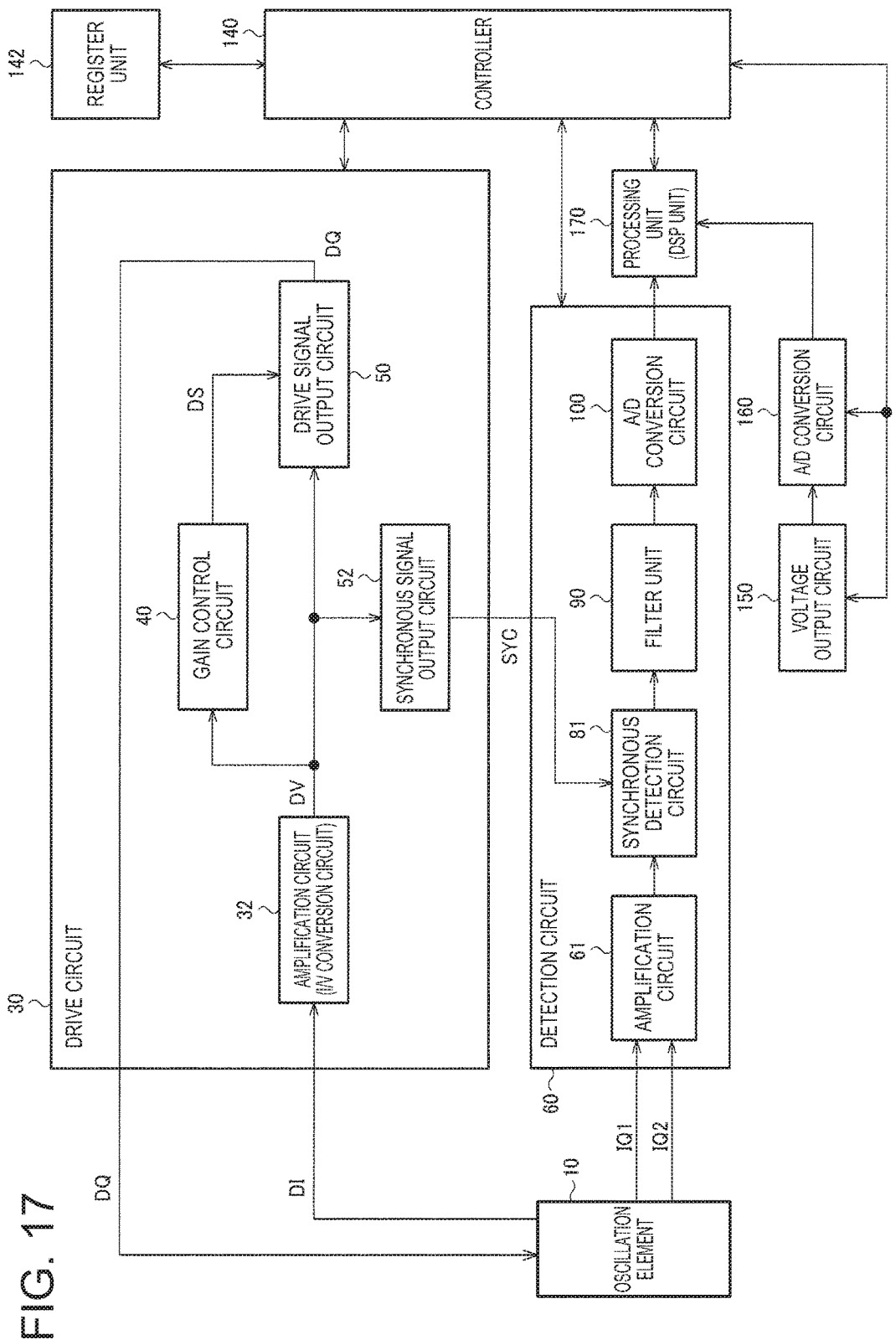
FIG. 17 is an example of a detailed configuration of a drive circuit and a detection circuit.

FIG. 17 illustrates an example of a detailed configuration of the drive circuit 30 and the detection circuit 60 of the circuit apparatus.

The drive circuit 30 includes an amplification circuit 32 that receives a feedback signal DI from the oscillation element 10, again control circuit 40 that performs automatic gain control, and a drive signal output circuit 50 that outputs a drive signal DQ to the oscillation element 10. In addition, the drive circuit 30 includes a synchronous signal output circuit 52 that outputs a synchronous signal SYC to the detection circuit 60. In addition, the configuration of the drive circuit 30 is not limited to FIG. 17, and various modification examples such as the omission of part of the components or the addition of other elements can be implemented.

The amplification circuit 32 (I/V conversion circuit) amplifies the feedback signal DI from the oscillation element 10. For example, the amplification circuit 32 outputs a signal by converting a signal DI of a current from the oscillation element 10 into a signal DV of a voltage. The amplification circuit 32 can be realized by an operational amplifier, a feedback resistance element, a feedback capacitor, or the like.

The drive signal output circuit 50 outputs the drive signal DQ based on a signal DV amplified by the amplification circuit 32. For example, the drive signal output circuit 50 can be realized by a comparator or the like, in a case where the drive signal output circuit 50 outputs a drive signal of a rectangular wave (or sine wave).

The gain control circuit 40 (AGC) outputs the control voltage DS to the drive signal output circuit 50, and controls the amplitude of the drive signal DQ. Specifically, the gain control circuit 40 monitors the signal DV, and controls the gain of an oscillation loop. For example, it is necessary to constantly maintain the amplitude of a drive voltage supplied to the oscillation element 10 (oscillation element for driving) so as to constantly maintain the sensitivity of the gyro sensor in the drive circuit 30. Therefore, the gain control circuit 40 for automatically adjusting the gain is provided in an oscillation loop of the drive oscillation systems. The gain control circuit 40 variably performs automatic adjustment on the gain so as to constantly maintain the amplitude (oscillation speed v of oscillation element) of a feedback signal DI from the oscillation element 10. The gain control circuit 40 can be realized by a full-wave rectifier that performs full-wave rectification on an output signal DV of the amplification circuit 32, an integrator that performs integration processing on the output signal of the full-wave rectifier, or the like.

The synchronous signal output circuit 52 receives the signal DV amplified by the amplification circuit 32, and outputs the synchronous signal SYC (reference signal) to the detection circuit 60. The synchronous signal output circuit 52 is realized by a comparator that generates the synchronous signal SYC of a rectangular wave by performing binarization processing for the signal DV of a sine wave (AC), a phase adjustment circuit (phase shifter) that performs phase adjustment on the synchronizing signal SYC, or the like.

The detection circuit 60 includes the amplification circuit 61, the synchronous detection circuit 81, the filter unit 90, and the A/D conversion circuit 100. The amplification circuit 61 receives first and second detection signals IQ1 and IQ2 from the oscillation element 10, and performs charge-voltage conversion, differential signal amplification, gain adjustment, or the like. The synchronous detection circuit 81 performs synchronous detection based on the synchronous signal SYC from the drive circuit 30. The filter unit 90 (low-pass filter) functions as a prelude filter of the A/D conversion circuit 100. In addition, the filter unit 90 also functions as a circuit that attenuates unwanted signals that cannot be removed by synchronous detection. The A/D conversion circuit 100 performs A/D conversion on signals after the synchronous detection.

In addition, for example, a phase of the detection signals IQ1 and IQ2 that are charge signals (current signals) from the oscillation element 10 is delayed by 90° with respect to the drive signal DQ that is a voltage signal. In addition, a phase is delayed by 90° in a Q/V conversion circuit, or the like of the amplification circuit 61. Therefore, a phase of an output signal of the amplification circuit 61 is delayed by 180° with respect to the drive signal DQ. Accordingly, for example, it is possible to remove an unwanted signal, or the like with a phase delayed by 90° with respect to the drive signal DQ by performing synchronous detection using the synchronous signal SYC of the same phase as that of the drive signal DQ (DV).

The processing unit 170 performs digital filter processing, digital correcting processing, and the like with respect to a digital signal (physical quantity data) from the A/D conversion circuit 100 in addition to processing that obtains the temperature data described above. Specifically, the processing unit 170 performs correction processing of the physical data based on the temperature data.

The controller 140 controls processing of the circuit apparatus 20. The controller 140 can be realized by a logic circuit (gate array or the like), a processor, and the like. A variety of switching control, mode settings, and the like in the circuit apparatus 20 are performed by the controller 140.

In addition, a method of the embodiment can apply to the moving object including the circuit apparatus. FIG. 18A illustrates an example of the moving object including the circuit apparatus 20 of the embodiment. The circuit apparatus 20 of the embodiment, for example, can be incorporated in various moving objects such as vehicles, airplanes, motorcycles, bicycles, vessels, or the like. The moving object is equipment or an apparatus that moves on the ground, in the sky, or the sea by mounting thereon, for example, a drive mechanism such as an engine, a motor, or the like, a steering mechanism such as a steering wheel, a rudder, or the like, and various electronic devices. FIG. 18A schematically illustrates a vehicle 206 as a specific example of the moving object. The vehicle 206 is incorporated with the gyro sensor 510 (sensor) including the oscillation element 10 and the circuit apparatus 20. The gyro sensor 510 can detect the posture of a vehicle body 207. The detection signal of the gyro sensor 510 is supplied to a vehicle body posture control device 208. The vehicle body posture control device 208 may control, for example, the hardness of the suspension according to the posture of the vehicle body 207, or the braking of each of wheels 209. Additionally, such posture control can be utilized in a variety of moving objects such as a two-legged walking robot, an aircraft, a helicopter, and the like. The gyro sensor 510 can be incorporated in realization of the posture control.

Figure 18B:
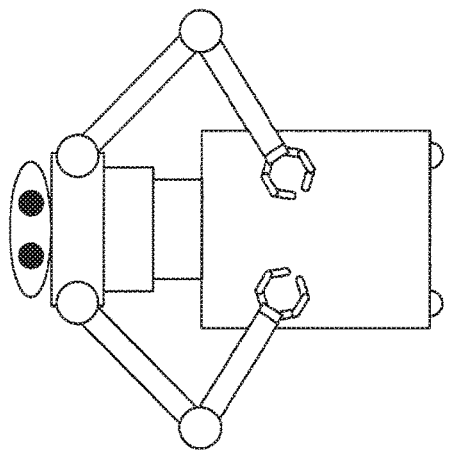
FIGS. 18A to 18D are examples of a moving object and an electronic apparatus incorporated with the circuit apparatus according to the embodiment.
Figure 18D:
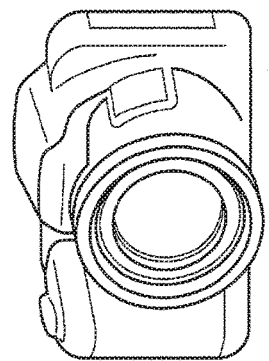
Figure 18A:
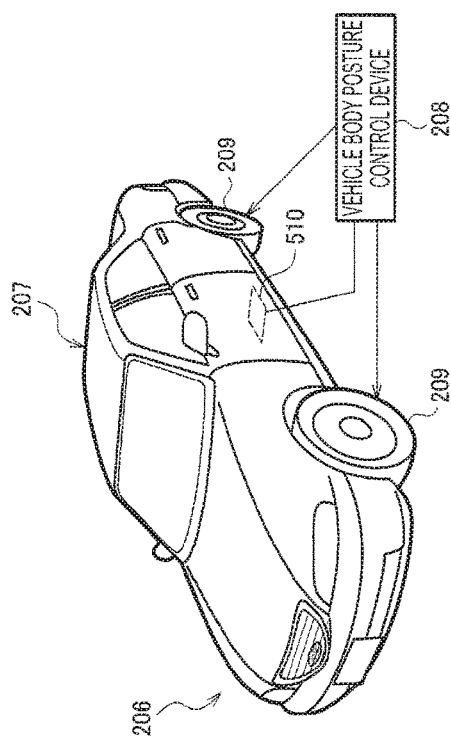
Figure 18C:
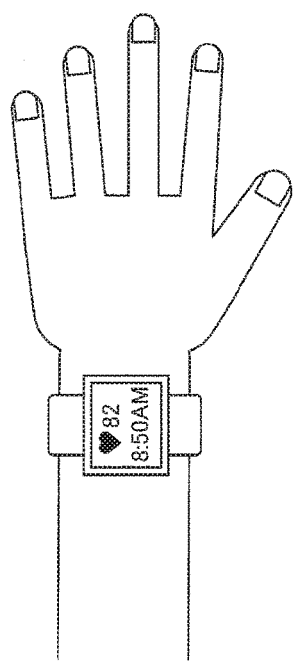

As illustrated in FIGS. 18B and 18C, the circuit apparatus of the embodiment can be applied to a variety of electronic apparatuses such as digital still cameras, biological information detection devices (wearable health equipment, for example, pulse meter, pedometer, activity meter, or the like), or the like. For example, it is possible to perform the image stabilization or the like using a gyro sensor or an acceleration sensor, for example, in a digital still camera. In addition, it is possible to detect body movement or a movement state of a user by using a gyro sensor or an acceleration sensor in the biological information detecting device. In addition, as illustrated in FIG. 18D, the circuit apparatus of the embodiment can also be applied to a movable part (arm and joints) and a main body of the robot. The robot can be implemented in any one of the moving object (running and walking robot) and the electronic apparatus (non-running and non-walking robot). For example, the circuit apparatus of the embodiment in autonomous running can be used in a case of the running and walking robot.

3. Variation Example

As illustrated in FIGS. 7A and 7B, it is considered that the voltage output circuit 150 outputs two output voltages $V_{REFP}$ and $V_{REFN}$ ($V_{PTATP}$ and $V_{PTATN}$) corresponding to the differential input signal configured with two input signals to the A/D conversion circuit 160, and the A/D conversion circuit 160 is a differential type A/D conversion circuit.

However, the invention is not limited to the voltage output circuit 150 and the A/D conversion circuit 160, and the voltage output circuit 150 and the A/D conversion circuit 160 may be operated in a single manner. A specific example of the voltage output circuit 150 and the A/D conversion circuit 160 is illustrated in FIGS. 19A and 19B.

Figure 19A:
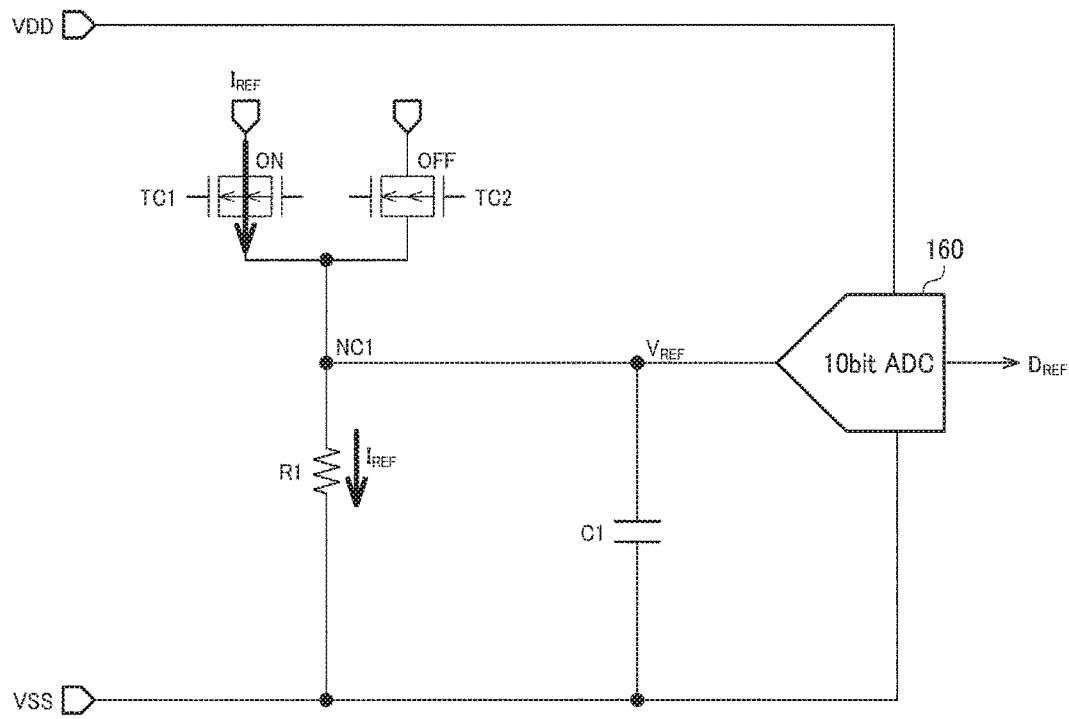
FIGS. 19A and 19B are another configuration examples of the voltage generation circuit.
Figure 19B:
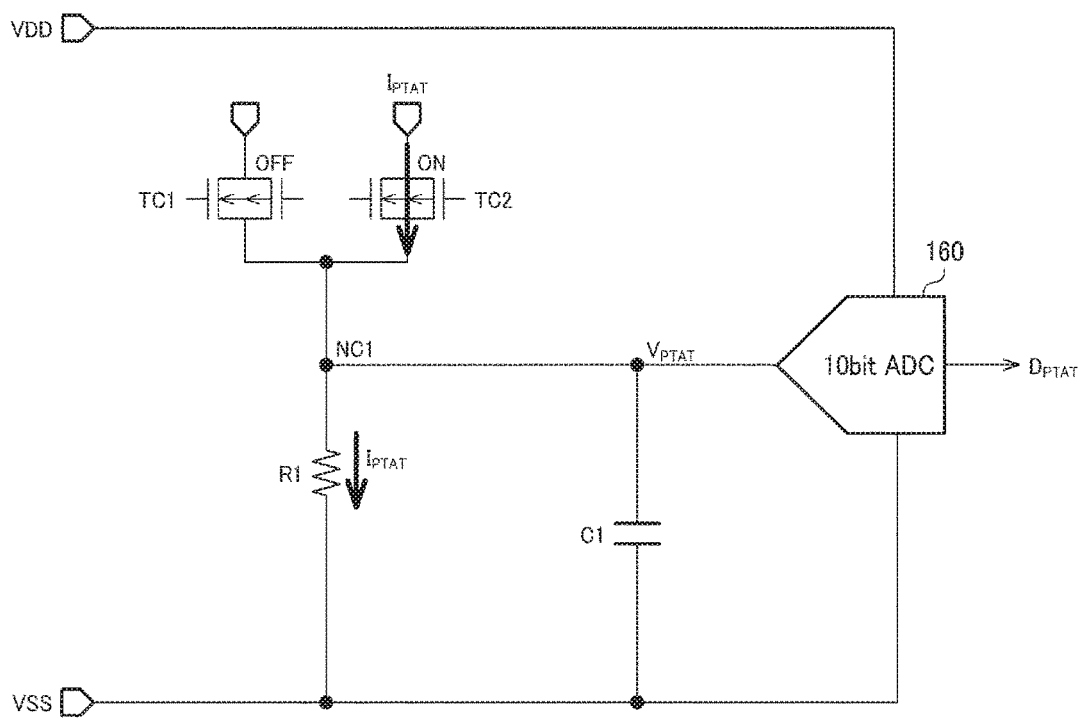

As known from FIGS. 19A and 19B, in a case compared to FIGS. 7A and 7B, a configuration is implemented in which the transistors TC3 and TC4, the resistance element R2, and the capacitor C2 are omitted. In addition, the node NC1 of TC1 and TC2 sides of the resistance element R1 is connected to the input node of the A/D conversion circuit 160.

As described above, the first current $I_{REF}$ is output to a resistance element during the first period. That is, as illustrated in FIG. 19A, the transistor TC1 may be turned on and the transistor TC2 may be turned off during the first period. In this case, the first current $I_{REF}$ flows in the resistance element R1 and a first output voltage $V_{REF}$ that is a voltage value of the node NC1 is output to the A/D conversion circuit 160. A value of $V_{REF}$ can be obtained by the following Equation (15).

$$V_{REF} = I_{REF} R1 \quad (15)$$

In addition, the second current $I_{PTAT}$ is output to a resistance element during the second period. That is, as illustrated in FIG. 19B, the transistor TC2 may be turned on and the transistor TC1 may be turned off during the second period. In this case, the second current $I_{PTAT}$ flows in the resistance element R1, and the second output voltage $V_{PTAT}$ that is a voltage value of the node NC1 is output to the A/D conversion circuit 160. A value of $V_{PTAT}$ can be obtained by the following Equation (16).

$$V_{PTAT} = I_{PTAT} R1 \quad (16)$$

In this case, A/D conversion in the A/D conversion circuit 160 is performed by the following Equation (17). The number of bits is 10-bit similar to a case of the differential. However, since a single operation is half (differential double times single) of a case of a full scale range, the value of $V_{PTAT}$ is $V_{DD}$ in the example corresponding to the above Equation (7).

$$D_{OUT} = (V_{IN}/V_{DD}) \times 2^{10} \quad (17)$$

Accordingly, the first digital value $D_{REF}$ and the second digital value $D_{PTAT}$ are obtained by the following Equations (18) and (19).

$$D_{REF} = \frac{I_{REF} R1}{V_{DD}} \times 2^{10} \quad (18)$$

$$D_{PTAT} = \frac{I_{PTAT} R1}{V_{DD}} \times 2^{10} \quad (19)$$

Therefore, since division processing in the processing unit 170 (division processing unit 171) may divide $I_{PTAT}$ by $I_{REF}$ similar to the above Equation (10), the following Equation (20) may be performed.

$$I_{PTAT}/I_{REF} = D_{PTAT}/D_{REF} \quad (20)$$

In a case of single, a value corresponding to $2^9$ of the above Equation (10) is not necessary, and a constant m may be 0, as described above.

In addition, as described above, the embodiment is described in detail. However, those skilled in the art can easily understand the fact that various modifications are possible without substantially departing from the scope of the invention. Accordingly, such modifications are intended to be included within the scope of the invention. For example, terms that are commonly described, at least once with more broad or different synonymous terms, in the specification or drawings, can be replaced by the different term, even in another place of the specification or drawings. In addition, the configuration and operation of the circuit apparatus are not limited to those described in the embodiment, and various modifications can be implemented.

The entire disclosure of Japanese Patent Application No. 2015-091211, filed Apr. 28, 2015 is expressly incorporated by reference herein.

What is claimed is:

1. A circuit apparatus comprising:
    a voltage output circuit that outputs a first output voltage when a first current of first temperature characteristics flows in a resistance element, and a second output voltage when a second current of second temperature characteristics different from the first temperature characteristics flows in the resistance element, wherein the voltage output circuit includes
        a first transistor configured to selectively provide the first current to the resistance element in a first period such that the voltage output circuit outputs the first output voltage in the first period, and
        a second transistor configured to selectively provide the second current to the resistance element in a second period such that the voltage output circuit outputs the second output voltage in the second period;
    an A/D conversion circuit that outputs a first digital value by performing A/D conversion on the first output voltage, and outputs a second digital value by performing A/D conversion on the second output voltage; and
    a processing unit that obtains temperature data by digital calculation processing based on the first digital value and the second digital value.

2. The circuit apparatus according to claim 1, wherein the processing unit performs the digital calculation processing that reduces dependence of the temperature data with respect to a resistance value of the resistance element.

3. The circuit apparatus according to claim 2, wherein the processing unit obtains the temperature data by the digital calculation processing including division processing that divides the second digital value by the first digital value.

4. The circuit apparatus according to claim 1, wherein the processing unit performs the digital calculation processing that reduces at least one variation of first variation of the temperature data by variation of a resistance value of the resistance element, and second variation of the temperature data by temperature characteristics of the resistance element.

5. The circuit apparatus according to claim 4, wherein the processing unit obtains the temperature data by the digital calculation processing including division processing that divides the second digital value by the first digital value.

6. The circuit apparatus according to claim 1, wherein the processing unit obtains the temperature data by the digital calculation processing including division processing that divides the second digital value by the first digital value.

7. The circuit apparatus according to claim 6, wherein in a case where the first digital value is $D_{REF}$, the second digital value is $D_{PTAT}$, and a given constant is m, the processing unit performs processing that calculates, as the division processing, $(D_{PTAT}+m)/(D_{REF}+m)$.

8. The circuit apparatus according to claim 1, further comprising:
    a first current generation circuit that generates the first current; and
    a second current generation circuit that generates the second current,
    wherein the voltage output circuit outputs a voltage, as the first output voltage, when the first current generated by the first current generation circuit flows in the resistance element, and outputs a voltage, as the second output voltage, when the second current generated by the second current generation circuit flows in the resistance element.

9. The circuit apparatus according to claim 1,
    wherein the first current is a reference current with flat temperature characteristics, and
    wherein the second current is a current having one of positive temperature characteristics and negative temperature characteristics.

10. The circuit apparatus according to claim 9, wherein in a case where the second current has the positive temperature characteristics, the resistance element is a resistance element having the positive temperature characteristics, and in a case where the second current has the negative temperature characteristics, the resistance element is a resistance element having the negative temperature characteristics.

11. The circuit apparatus according to claim 9,
    wherein the second current has the positive temperature characteristics, and
    wherein the resistance element is a well resistance or a diffusion resistance.

12. The circuit apparatus according to claim 1, wherein the processing unit performs digital low-pass filter processing with respect to the temperature data obtained by the digital calculation processing.

13. The circuit apparatus according to claim 12, wherein the processing unit performs the digital low-pass filter processing where a cut-off frequency is varied with respect to the temperature data obtained by the digital calculation processing.

14. The circuit apparatus according to claim 13, wherein the processing unit sets the cut-off frequency to a first frequency during a first period after starting, and sets the cut-off frequency to a second frequency lower than the first frequency during a second period after the first period has elapsed.

15. The circuit apparatus according to claim 1,
    wherein the A/D conversion circuit is a differential A/D conversion circuit that receives a differential input signal configured with a first input signal and a second input signal,
    wherein the voltage output circuit includes, as the resistance element, a first resistance element and a second resistance element, and
    wherein the voltage output circuit outputs, as a voltage of the first input signal, an output voltage when the first current flows in the first resistance element to the A/D conversion circuit, and outputs, as a voltage of the second input signal, an output voltage when the first current flows in the second resistance element to the A/D conversion circuit, in a case where the first output voltage is output, and outputs, as a voltage of the first input signal, an output voltage when the second current flows in the first resistance element to the A/D conversion circuit, and outputs, as a voltage of the second input signal, an output voltage when the second current flows in the second resistance element to the A/D conversion circuit, in a case where the second output voltage is output.

16. The circuit apparatus according to claim 1, further comprising:
    a detection circuit that outputs physical quantity data corresponding to physical quantity based on a detection signal corresponding to the physical quantity output from a physical quantity transducer; and a drive circuit that drives the physical quantity transducer, wherein the processing unit performs correction processing based on the temperature data with respect to the physical quantity data from the detection circuit.

17. An electronic apparatus comprising:
the circuit apparatus according to claim 1.

18. A moving object comprising:
the circuit apparatus according to claim 1.

19. A circuit apparatus comprising:
a voltage output circuit that outputs a first output voltage when a first current of first temperature characteristics flows in a first resistance element and a second resistance element, and a second output voltage when a second current of second temperature characteristics different from the first temperature characteristics flows in the first resistance element and the second resistance element, wherein the voltage output circuit includes
  a first transistor configured to selectively provide the first current to the first resistance element in a first period such that the voltage output circuit outputs the first output voltage in the first period,
  a second transistor configured to selectively provide the second current to the first resistance element in a second period such that the voltage output circuit outputs the second output voltage in the second period,
  a third transistor configured to selectively provide the first current to the second resistance element in the first period such that the voltage output circuit outputs a third output voltage in the first period, and
  a fourth transistor configured to selectively provide the second current to the second resistance element in the second period such that the voltage output circuit outputs a fourth output voltage in the second period;
an A/D conversion circuit that outputs a first digital value by performing differential A/D conversion on the first output voltage and the third output voltage in the first period, and outputs a second digital value by performing differential A/D conversion on the second output voltage and the fourth output voltage in the second period; and
a processing unit that obtains temperature data by digital calculation processing based on the first digital value and the second digital value.

* * * * *